United States Patent [19]

Nagata et al.

[11] Patent Number: 5,140,517

[45] Date of Patent: Aug. 18, 1992

[54] IC CARD WITH KEYBOARD FOR PRESTORING TRANSACTION DATA

[75] Inventors: Masanori Nagata; Shinya Yoshida, both of Kyoto; Susumu Yamashita, Kanagawa; Makoto Okahashi, Osaka, all of Japan

[73] Assignee: Omron Tateisi Electronics Co., Kyoto, Japan

[21] Appl. No.: 545,505

[22] Filed: Jun. 29, 1990

Related U.S. Application Data

[63] Continuation of Ser. No. 181,716, Apr. 14, 1988, Pat. No. 4,959,788, which is a continuation-in-part of Ser. No. 55,258, May 29, 1987, abandoned, which is a continuation-in-part of Ser. No. 711,818, Mar. 14, 1985, abandoned.

[30] Foreign Application Priority Data

| Mar. 19, 1984 | [JP] | Japan | 59-53949 |
| Mar. 21, 1984 | [JP] | Japan | 59-54966 |
| Mar. 21, 1984 | [JP] | Japan | 59-54967 |
| Mar. 21, 1984 | [JP] | Japan | 59-54968 |
| May 30, 1986 | [JP] | Japan | 61-126897 |

[51] Int. Cl.⁵ .......................... G07F 7/10; G06K 1/18
[52] U.S. Cl. ..................... 364/408; 902/22; 235/579
[58] Field of Search ............... 364/408; 235/379, 380; 902/22, 24, 26, 40

[56] References Cited

U.S. PATENT DOCUMENTS

| 3,970,992 | 7/1976 | Boothroyd et al. | 364/900 |
| 4,277,837 | 7/1981 | Stuckert | 235/379 |
| 4,298,793 | 11/1981 | Melis et al. | 364/705 Y |
| 4,454,414 | 6/1984 | Benton | 235/380 |
| 4,460,965 | 7/1984 | Trehn et al. | 235/379 X |
| 4,511,970 | 4/1985 | Okano et al. | 235/379 |
| 4,529,870 | 7/1985 | Chaum | 235/381 |
| 4,575,621 | 3/1986 | Dreifus | 235/380 |
| 4,593,155 | 6/1986 | Hawkins | 340/825.5 |
| 4,603,249 | 7/1986 | Hoppe et al. | 235/492 |
| 4,605,844 | 8/1986 | Haggan | 235/380 |
| 4,611,205 | 9/1986 | Eglise | 340/825.35 |
| 4,612,436 | 9/1986 | Okada | 235/492 X |
| 4,614,861 | 9/1986 | Pavlov et al. | 235/380 |
| 4,623,964 | 11/1986 | Getz et al. | 364/401 |
| 4,625,276 | 11/1986 | Benton et al. | 364/408 |
| 4,634,845 | 1/1987 | Hale et al. | 235/379 X |
| 4,679,236 | 7/1987 | Davies | 235/380 X |
| 4,697,072 | 9/1987 | Kawana | 235/380 |
| 4,707,592 | 11/1987 | Ware | 235/379 |
| 4,709,137 | 11/1987 | Yoshida | 235/379 |
| 4,734,858 | 3/1988 | Schlafly | 364/408 |
| 4,736,094 | 4/1988 | Yoshida | 235/379 |
| 4,749,982 | 6/1988 | Rikuna et al. | 340/146.2 |
| 4,959,788 | 9/1990 | Nagata et al. | 364/408 |

FOREIGN PATENT DOCUMENTS

| 3222288 | 12/1983 | Fed. Rep. of Germany . |
| 2471003 | 12/1981 | France . |
| 00146369 | 2/1981 | Japan . |
| 0197573 | 11/1983 | Japan . |
| 58-197573 | 3/1984 | Japan . |

OTHER PUBLICATIONS

Neues aus der Technik, Nos. 4/5, Sep. 15, 1980, p. 2, Surzburg, DE; "Kreditkarte mit Tastenfeld (und Wiedergabeanordnung)".

"Smart Credit Cards: The Answer to Cashless Shopping" Stephen Weinstein, Feb. 1984, IEEE Spectrum 43–49.

"Memory Cards a new concept in personal computing" Mark Mills, Jan. 1984 Byte, pp. 154–168.

*Primary Examiner*—Dale M. Shaw
*Assistant Examiner*—Andrew Bodendorf
*Attorney, Agent, or Firm*—Dickstein, Shapiro & Morin

[57] ABSTRACT

An IC card transaction system is disclosed in which at least a portion of the data required to complete a transaction processing is stored in the card by a customer in advance of transaction processing. An automatic transaction processing unit reads the transaction data stored in the card, checks to determine what transaction data, if any, which is required for the processing of the transaction is not stored in the card and, if necessary, receives from the customer any additional data which was not previously stored in the card and which is required to complete a transaction.

7 Claims, 20 Drawing Sheets

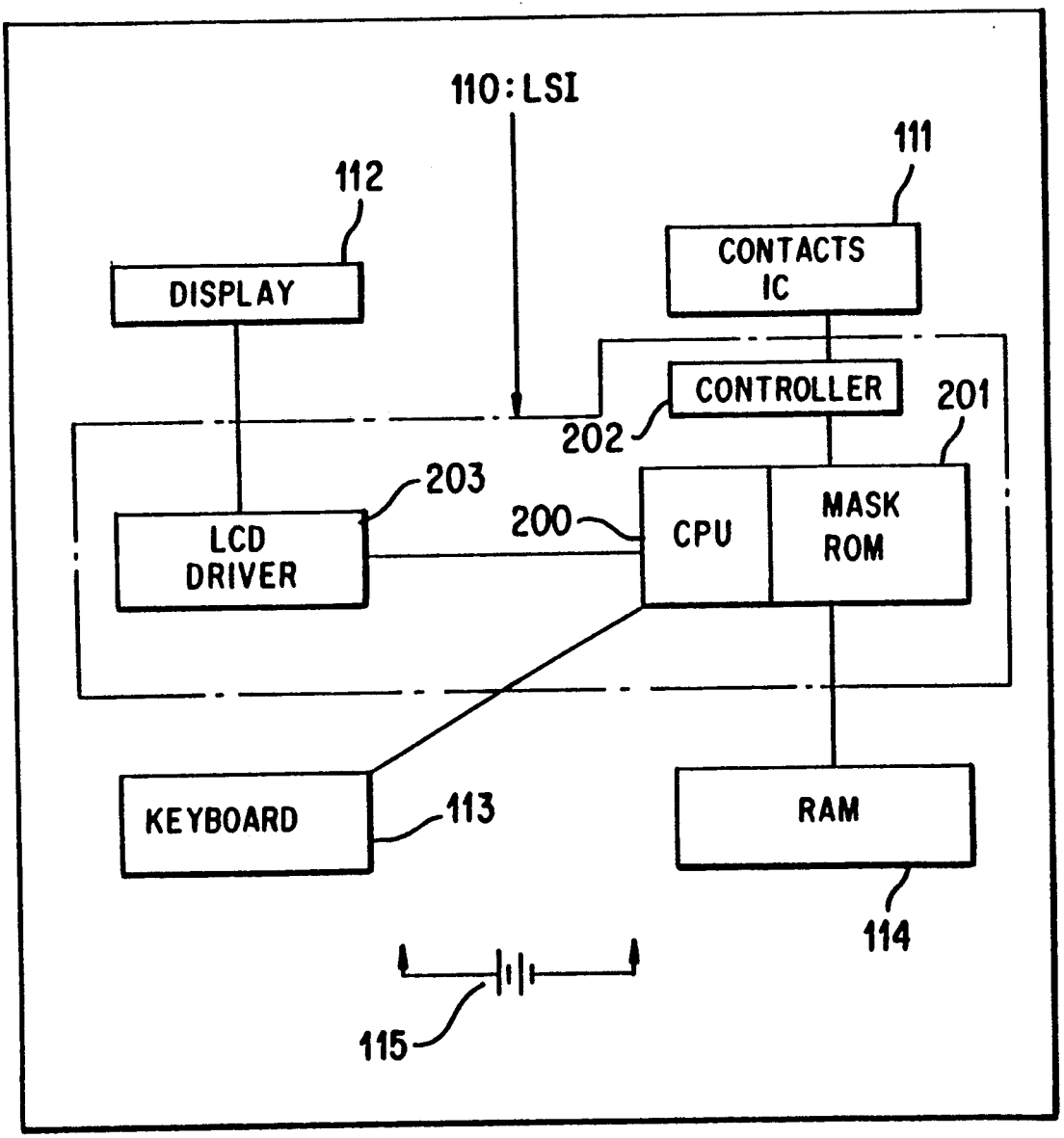

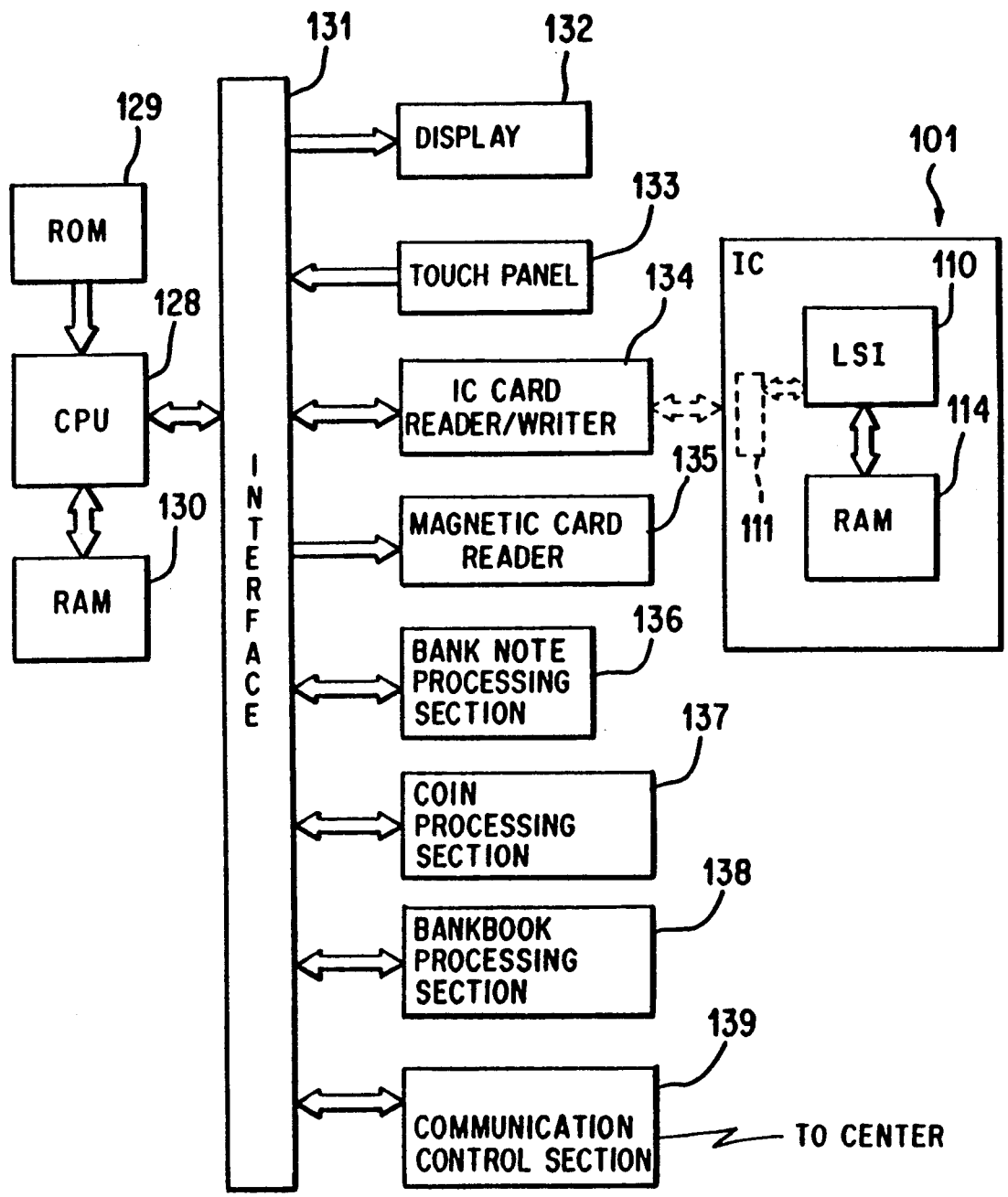

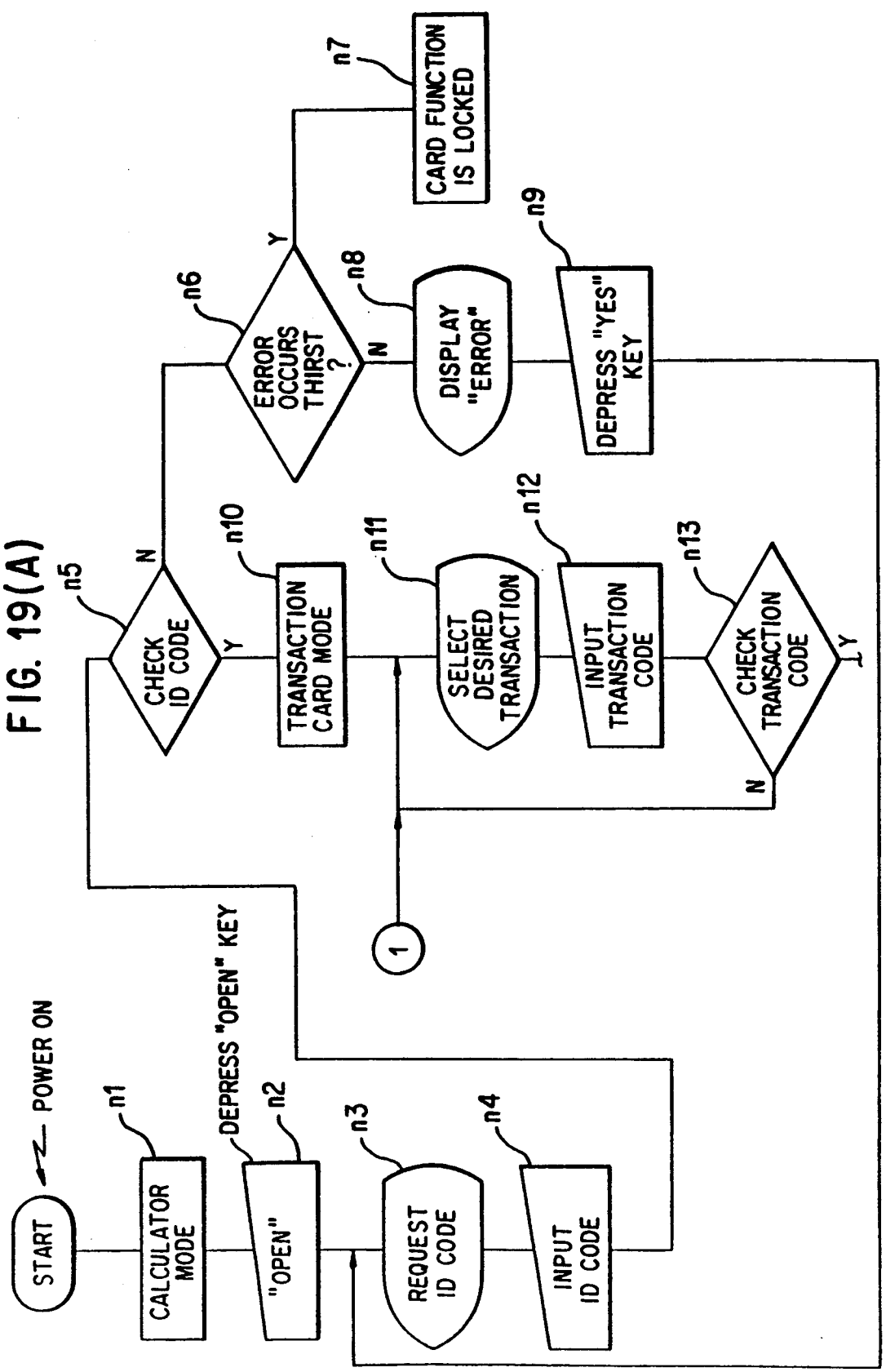

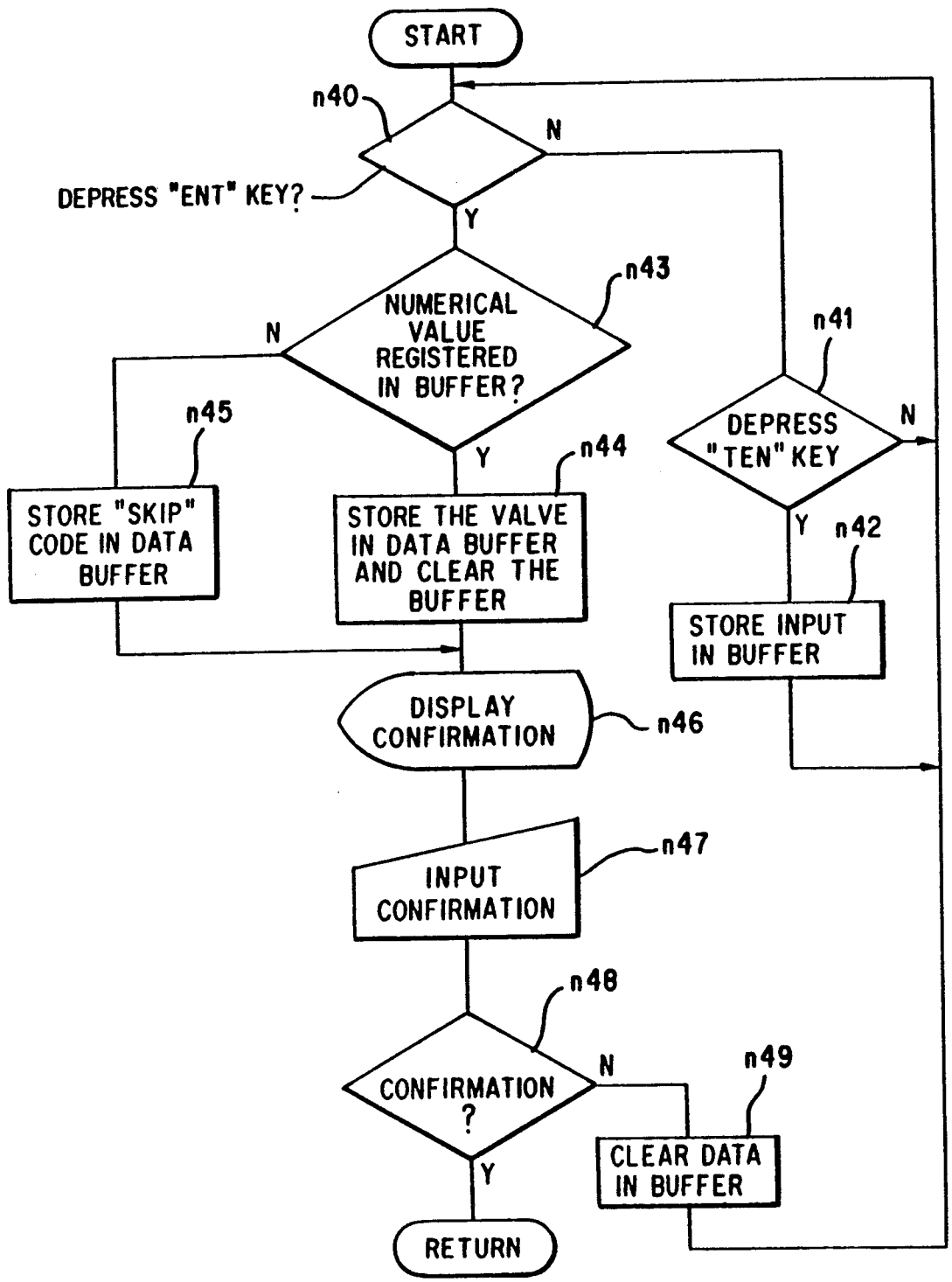

IC CARD WITH KEYBOARD FOR PRESTORING TRANSACTION DATA

CROSS-REFERENCE TO RELATED APPLICATIONS

This application is a continuation of application Ser. No. 07/181,716, filed Apr. 14, 1988, which is now U.S. Pat. No. 4,959,788 which is a continuation in part of Ser. No. 07/055,258 filed May 29, 1987, abandoned, which is a continuation in part of Ser. No. 06/711,818 filed on Mar. 14, 1985 and which is abandoned.

BACKGROUND OF THE INVENTION

1. Field of the Invention

The present invention relates to an IC (integrated circuit) card and to a financial transaction processing system using the IC card. More particularly, the invention relates to an IC card which is capable of storing, a part or all of the financial transaction data which is used to carry out a financial transaction at an automatic transaction processing unit. A user conducts at least a portion of the operations which are normally conducted by the user at the automatic transaction processing unit at the IC card itself, in advance of a visit to the automatic transaction processing unit. Thus, data necessary for a transaction with a financial institution such as a bank or credit company can be at least partially or entirely entered in the IC card prior to visiting the automatic transaction processing unit, thereby reducing the time required at an automatic transaction processing unit to complete the processing of a transaction.

2. Description of the Prior Art

At present, magnetic cards such as so-called cash cards and credit cards have been widely used for payments, deposits, transfers and the like financial transactions through an on line system at a financial institution such as a bank or a credit company. Data for identifying a customer, such as a secret number, or other identifying data, is magnetically stored on the card. When a transaction is to be performed, a customer visits an automatic transaction processing unit, typically located at a bank or other convenient location, with his card. The card is then inserted into an automatic transaction processing unit such as an automatic teller machine (ATM) or a cash dispenser (CD) installed at the bank or other location. At the automatic transaction processing unit the customer enters into the unit data necessary for a transaction such as the secret number, the kind of transaction desired, and a transaction amount. This data is entered by operating data entry means such as a keyboard in accordance with predetermined procedures. Such automatic transaction processing units have become widely known and are operated directly by the customers as on line terminal units. A single automatic transaction processing unit is typically now capable of performing a wide variety of transactions such as deposit and withdrawal processing, balance inquiries, bank book entries, and transfer transactions in addition to payment processing. As a consequence, users are now required to perform an increased number of operations for each transaction such as the selection of the kind of transaction, amount, the various accounts among and to which funds are being transferred, etc., resulting in the time required per transaction being increased.

Moreover, the transactions themselves are becoming more complex, even with advanced automatic transaction processing units, and inexperienced customers may fail to complete all of the desired transaction processing operations by themselves. As a consequence, the operating efficiency of automatic transaction processing units has been lowered and it is often now necessary to provide assistance to a customer operating such a unit.

In addition, a conventional magnetic card and systems employing the same are sometimes subjected to unauthorized use through theft, loss and the like. This unauthorized are usually occurs at an automatic transaction processing unit such as an ATM or CD where there is no person in attendance. Of course, even with an unauthorized use of the automatic transaction processing units, a secret number must be known to the unauthorized user, but it is sometimes possible to decode the information stored on the conventional magnetic card since the secret number of a user tends to comprise a code with which the user is familiar such as a birth date, telephone number, or the like. Consequently, an unauthorized user, familiar with a customer possessing a valid card, might be able to assume the secret number.

SUMMARY OF THE INVENTION

The invention is designed to solve the foregoing problems.

In one aspect of the invention, the user's card is in the form of an integrated circuit (IC) card which includes necessary processing and storage means to enable the user to conduct at least a portion of the data entry and transaction processing procedures necessary to operate an automatic transaction processing unit at the IC card itself, prior to the user visiting the automatic transaction processing unit. The transaction processing data is entered by the user into the IC card. Then, the IC card is inserted into the automatic transaction processing unit and the processing unit possesses a particular transaction on the basis of data which is read from the IC card in place of data which would otherwise be entered by the user through the keyboard at the automatic transaction processing unit. Each individual user can enter transaction processing data in advance into his own IC card and can therefore effect a reliable input operation, without being restricted by time at the automatic transaction processing unit.

Thus, with the invention, the user is able to conduct at least a portion or the transaction processing operations, which have heretofore been performed entirely at the automatic transaction processing unit, at the IC card itself which has an entry means for entering transaction data. The data may enter all of the financial transaction data necessary for a transaction into the IC card or, may enter only a portion of the data necessary for a transaction, so that the automatic transaction processing unit will then automatically recognize this and configure itself to receive the remaining financial transaction data from a user after the IC card is inserted into the automatic transaction processing unit. If an individual user enters all of the transaction processing data in advance into his IC card, a reliable entry of this data into the automatic transaction processing unit occurs by merely inserting the IC card thereinto. If a user enters only a portion of the data necessary for a transaction processing into his IC card, the automatic transaction processing unit will, upon insertion of the IC card therein recognize and read what has been entered into the IC card and then operate to receive the remaining data necessary to complete a financial transaction from the user at the data entry means of the automatic transaction processing unit.

In either case, whether a transaction is processed automatically by the automatic transaction processing unit because all financial data was previously entered into the IC card, or in the case where a portion of the IC card data has been entered and the remainder must be entered into the data entry means of the automatic transaction processing unit, the operating efficiency of the automatic transaction processing unit is increased. In each case at least a portion of the data has been pre-entered and pre-checked by the customer before he arrives at the automatic data transaction processing unit and to that extent the amount of time required to complete a transaction at the automatic transaction processing unit is decreased, thus improving efficiency. Moreover, data such as an identification code number and the amount of money handled on the transaction can be input into the IC card in advance so that there is no fear of the identification code number or other entered data being seen by others at the automatic transaction processing unit, thus improving security of the overall system.

The entry of all financial transaction data into the IC card prior to arrival at an automatic transaction processing unit has the advantage of maximally reducing the amount of time required for a customer to be present at the automatic transaction processing unit. However, if all necessary transaction processing data is entered into the IC card in advance, it is impossible to decide or change the contents of the transaction at the time of the transaction. In addition, if the IC card is lost after data entry, it can be used in unauthorized manner by the finder by merely inserting it into the automatic transaction processing unit. For this reason, entry of only a portion of the financial data into the IC card prior to a user visiting the automatic transaction processing unit may be desirable. In the latter system the remainder of the required data not entered at the IC card is entered directly into the automatic transaction processing unit, whereby it is possible to provide freedom to enable the user to decide or change the operation of a financial transaction at the time of the transaction and also to insure to a greater degree safety and integrity of a customer's account.

In view of the foregoing, one object of the invention is to provide an IC card transaction system when at least a portion of the data necessary for processing a financial transaction is entered and stored in advance into the IC card so that when the IC card is presented to an automatic transaction processing unit the IC card data is read and used by the unit to process a transaction thereat.

Another object of the invention is to provide an IC card transaction system of the type described above and which generally employs a conventional automatic transaction processing unit, modified to read and use data stored in an IC card pertaining to a transaction. Another object of the invention is to provide an IC financial transaction card which contains a program of processing procedures associated with entry and display of transaction data into the IC card, a storage means, data entry means for entering data necessary for a financial transaction into the storage means, and data display means for displaying the entered data.

Another object of the invention is to provide an IC card transaction system employing an automatic transaction processing unit for communicating with the card wherein the terminal includes data reading means for reading out the financial transaction data stored in the card, and transaction processing means for performing a financial transaction using data read from the card.

Another object of the invention is to provide an IC card transaction system as described in the preceeding paragraph wherein the automatic processing unit is arranged, depending on whether the IC card contains all of the data necessary for a transaction or only a part thereof, to completely carry out the transaction without any additional data being required, where all necessary transaction data has been entered and pre-stored in the IC card, or to receive additional transaction processing data from the user which is entered directly into the automatic transaction processing unit, where all necessary transaction data has not been pre-stored in the IC card.

Another object of the invention is to provide an IC card and an associated automatic transaction processing unit, the latter of which includes a transaction terminal detecting means for detecting termination of a transaction and data erasing means responsive to the output of the transaction termination detection means for erasing a portion of the data stored in the IC card. Such erased data may include a secret number data previously entered by a user.

Another object of the invention is to provide an IC card transaction system in which the IC card includes a storage area for storing an entered effective time period concerning the data necessary for a financial transaction, and in which an automatic transaction processing unit includes a reading means for reading out the effective time period data stored in the card, and a means for using the effective time period data to determine whether the transaction is being performed within the effective time period entered into the IC card. If the time period is within that specified by the data within the IC card, the transaction is allowed to proceed, otherwise it cannot.

Another object of the invention is to provide an IC card transaction system in which an automatic transaction processing unit reads data from the IC card and determines whether all of the financial processing data necessary to compute a financial transaction has been entered therein and, if not, elicits this data from a customer. When the customer enters the missing financial transaction data, the unit then completes transaction processing.

The above described objects, advantages and features of the present invention will be more readily understood from the following detailed description of the various embodiments thereof which are presented in connection with the accompanying drawings.

BRIEF DESCRIPTION OF THE DRAWINGS

The various aspects of the present invention will be described in connection with FIGS. 1 through 13 which illustrate one embodiment of the invention wherein all of the data necessary for a transaction is entered prior to a user visiting an automatic transaction processing terminal, and FIGS. 14 through 20 which illustrate to another embodiment of the invention wherein a portion of the data necessary for a transaction is entered prior to a user visiting an automatic transaction processing terminal.

FIG. 2 is a perspective view of the FIG. 1 integrated circuit card of;

FIG. 5 is a schematic block diagram showing an electric structure of an automatic transaction processing unit for use with the FIG. 1 integrated circuit card;

FIG. 6 is a memory map of the processing unit of FIG. 5;

FIG. 15 is a block diagram of a control section in the IC card of the FIG. 14 embodiment; ROM and a RAM which are incorporated in the FIG. 14 IC

FIG. 18 is a block diagram of a control section in the FIG. 17 ATM;

FIGS. 19(A), 19(B) and 19(C) are flow charts showing the operation of the control section in the FIG. 14 IC card.

DESCRIPTION OF THE PREFERRED EMBODIMENTS

Figure 1:
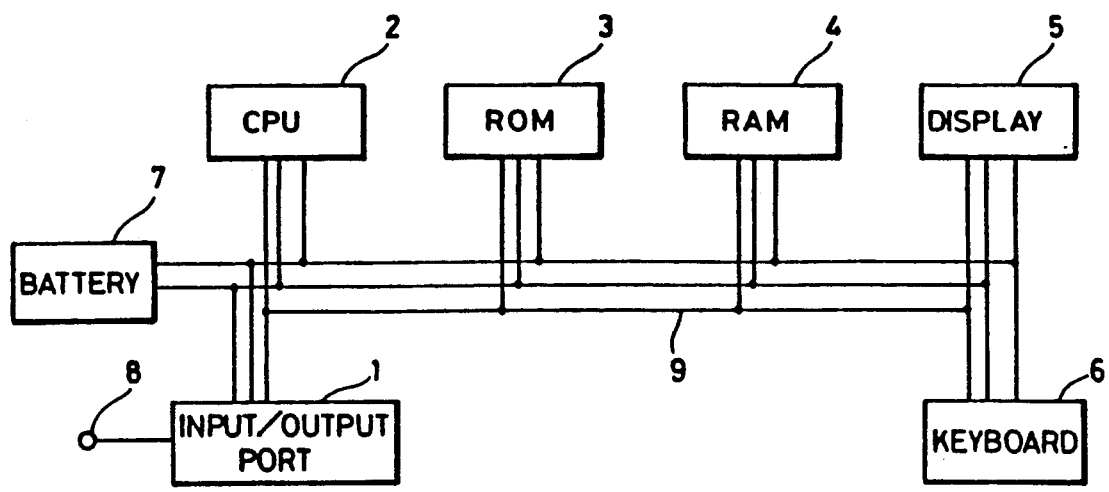
FIG. 1 is a schematic block diagram showing an electrical structure of an integrated circuit card used in a first embodiment of the present invention.
Figure 2:
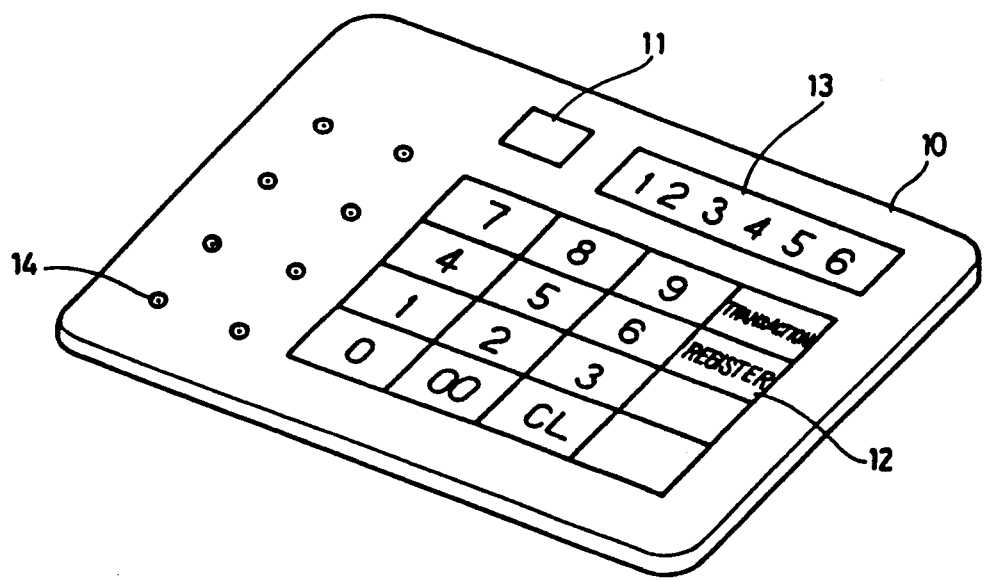

FIG. 1 is a schematic block diagram showing a block diagram of an IC card employed in a first embodiment of the present invention, while FIG. 2 illustrates the external appearance of the card.

The IC card 10 has the same size and configuration as a conventional magnetic card such as a cash card and a credit card, and contains at least an IC memory such as a read only memory 3 and a random access memory 4, an integrated circuit central processing unit 2, a plurality of, usually eight, contacts 14 for communicating with a terminal, a display 5, a keyboard 6, a battery 7 and an input/output port 1. In a conventional magnetic card, storage capacity is rather small and it is easy to decode stored information. The feature of the IC card used in the invention is that, as compared with a conventional magnetic card, it has a large storage capacity and security is excellent because stored information can be made so that it is not easily decoded by others, by using a program which can not be easily read out.

Referring again to FIG. 1, an input/output port 1 having an input/output line terminal 8 is connected through a data bus 9 to a central processing unit (CPU) 2, a read only memory (ROM) 3, a random access memory (RAM) 4, a display 5 and a keyboard 6. Electric power is supplied from a battery 7 to the input/output port 1, the central processing unit 2, the read only memory 3, the random access memory 4, the display 5 and the keyboard 6. The input/output port 1 is used for communicating with an automatic transaction processing unit, also referred to herein as a terminal, (see FIG. 5), for processing a financial transaction. The ROM 3 stores fixed data relating to transaction processing, such as an ID number, a bank number, a branch number, an account number and an effective time period, and a program for transaction processing. The RAM 4 stores data necessary for each transaction, such as a secret number and transaction amount. The keyboard 6 is used for entering the data necessary for each transaction into the RAM 4. The display 5 displays the entered data to a user.

FIG. 2 is a perspective view of an IC card which may be used in the first embodiment of the present invention. Referring to FIG. 2, the IC card body 10 has on a front surface panel a power switch 11, a keyboard 12 (also schematically shown in FIGS. 1 as 6) including a plurality of touch keys, a liquid crystal display 13 (also schematically shown as 5 in FIG. 1) and a plurality of electrical contacts 14. The power switch 11 is used for supplying power to each of constituent elements of the IC card shown in FIG. 1. The keyboard 12 is used for entering the data necessary for transaction processing into the IC card so that the data is stored in the RAM 4. The liquid crystal display 13 displays the above described entered data to a user. The contacts 14 are used for electrically connecting the IC card to the terminal when the IC card is inserted thereinto.

Figure 3:
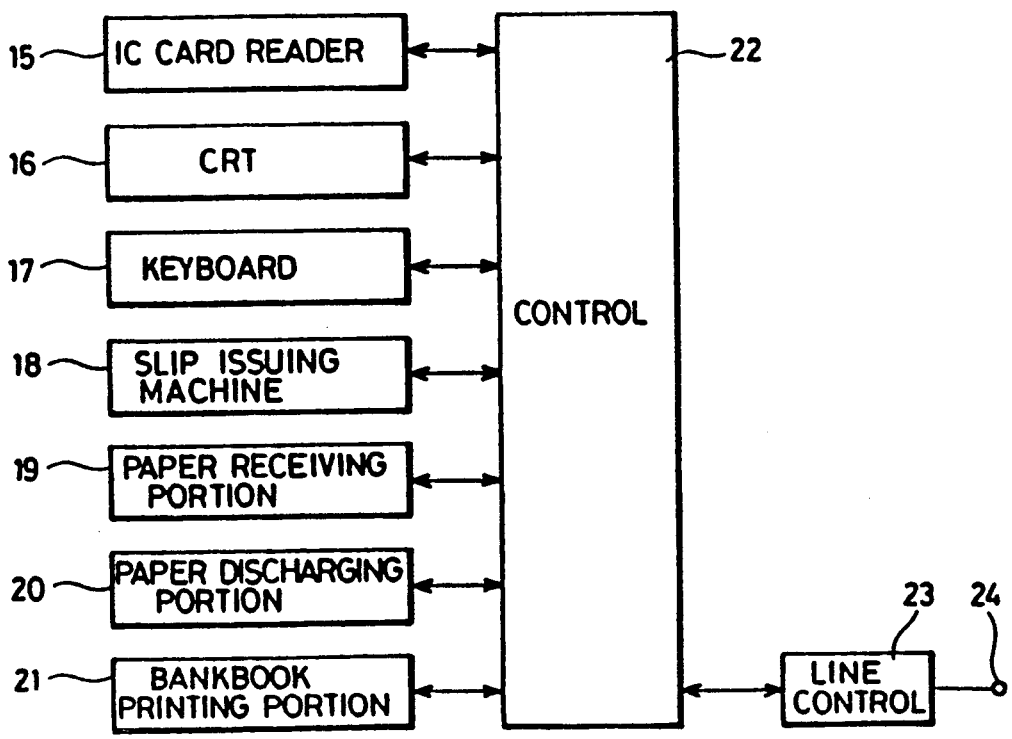
FIG. 3 is a memory map of the FIG 1 integrated circuit card.

FIG. 3 is a diagram showing a memory map of the IC card which comprises a storage region in read only memory 3 and a storage region in random access memory 4. The storage region in the ROM 3 comprises a program storage area, an ID number storage area, a bank number storage area, a branch number storage area, an account number storage area, and an effective time period storage area. The storage region in the RAM 4 comprises a secret number storage area, a deposit (credit) storage area, a payment storage area, a transaction number storage area, a bank-to-be-transferred area, an account-to-be-transferred area, and a transfer amount area.

Figure 4:
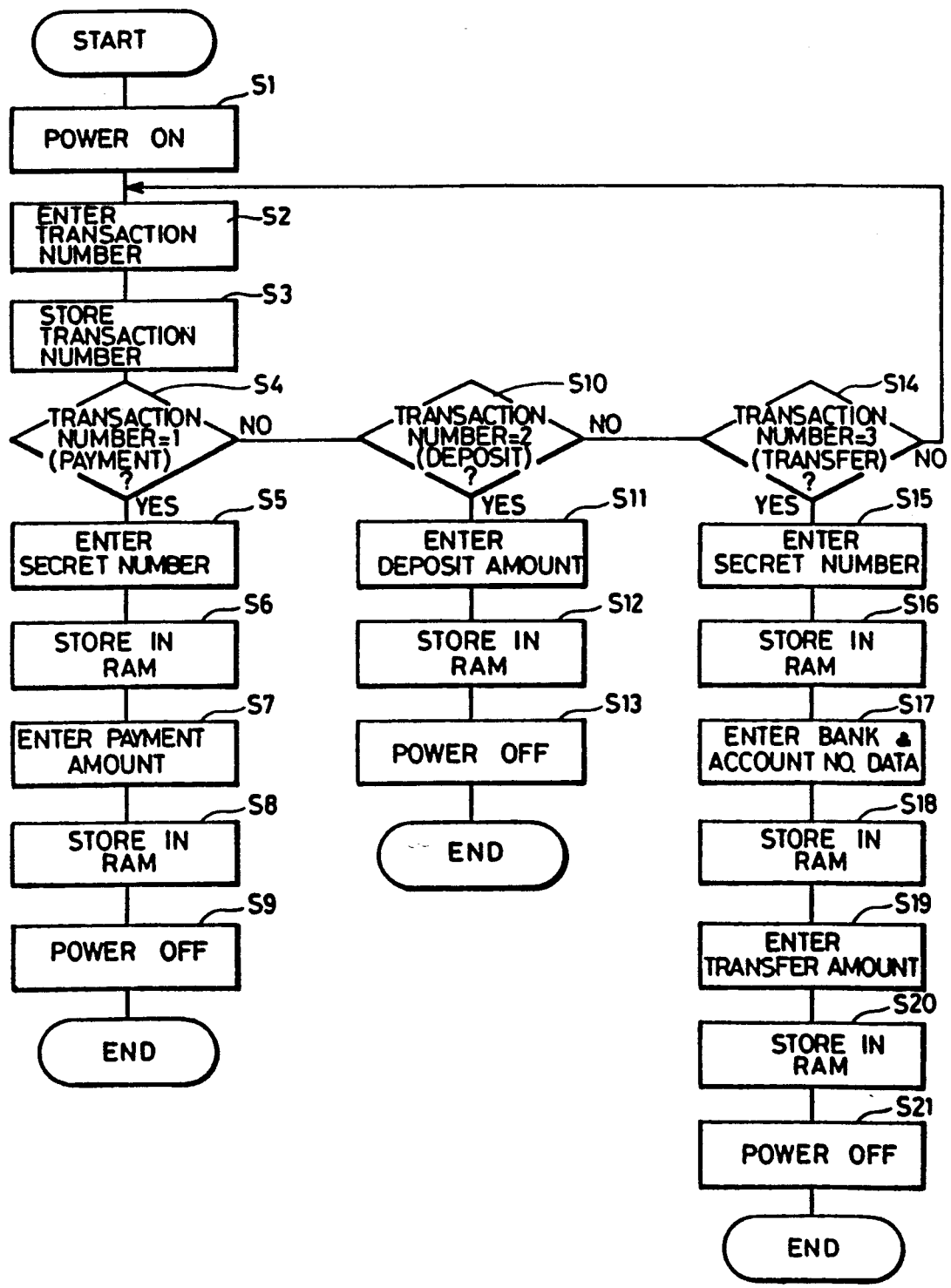
FIG. 4 is a flow diagram explaining a transaction data storing operation for the FIG 1 integrated circuit card.

FIG. 4 is a flow diagram explaining a specific operation program for entering transaction information and storing the same into the IC card, prior to transaction processing, the program being stored in the ROM 3.

Referring to FIGS. 1 to 4, a specific operation of the IC card when the transaction data is entered will be described. In the flow diagram of FIG. 4, the IC card has data entered and stored representing the kind of transaction (referred to as "a transaction number" hereinafter), a secret number, and a transaction amount prior to transaction processing.

Before going to a bank or credit company at which a client has an account, he enters into his IC card the above described transaction data, that is, the transaction number, the secret number, and the transaction amount whenever and wherever he wishes to do so. To enter this data the customer first turns on a power switch 11 of the IC card (step S1). As a result, power is supplied from the battery 7 to each of constituent elements of the IC card shown in FIG. 1. Then, the customer operates the keyboard 12 to enter into the card a desired transaction number, that is, a number representing the kind of transaction desired (step S2). In this embodiment, it is assumed that the transaction number 1 denotes a payment processing, the transaction number 2 denotes a deposit processing, and the transaction 3 denotes a transfer processing. The selected transaction number is stored in the transaction number storage area in the RAM 4 (step S3). In addition, the following data entering and storing operations are performed, based on the program corresponding to the selected transaction number which is stored in program storage area of the ROM 3.

If and when the customer selects the transaction number 1 (payment) (as determined in step S4), he then enters his secret number using the keyboard 12 (step S5). The secret number is stored in the secret number storage area of the RAM 4 (FIG. 3) in the IC card (step S6). Subsequently, the customer further enters an amount of payment using the keyboard 12 (step S7). The data of the payment amount is stored in the payment storage area of the RAM 4 (step S8). As a result, the storing of transaction data for a payment transaction processing is completed and then the power supply of the IC card is automatically turned off (step S9).

If and when the transaction number 2 (deposit) is selected (as determined in step S10), the customer enters an amount of deposit using the keyboard 12. The entered amount data is stored in the deposit storage area of the RAM 4 (step S12). As a result, the transaction data storage for a deposit transaction processing is completed, and then the power supply of the IC card is automatically turned off (step S13).

If and when the transaction number 3 (transfer) is selected (as determined in step S14), the customer first enters his secret number by using the keyboard 12 (step S15). The secret number is stored in the secret number storage area of the RAM 4 (step S16). Subsequently, the customer enters the bank number to be transferred and the account number thereof by using the keyboard 12 (step S17). Such data is also stored in the corresponding areas of the RAM 4 (step S18). In addition, the customer enters an amount of the transfer using the keyboard 12 (step S19). The amount data is also stored in the transfer amount area of the RAM 4 (step S20). As a result, storing of the data relating to a transfer transaction processing is completed and then the power supply of the IC card is automatically turned off (step S21). As the data is entered by the keyboard 12 it is also displayed on the liquid crystal display 13, so that the customer can confirm whether the entered data is correct or not.

As described in the foregoing, a transaction number, a secret number, and a transaction amount can be securely stored in advance in the IC card, prior to transaction processing.

FIG. 5 is a schematic block diagram showing an electric structure of an automatic transaction processing unit, also called a terminal for communicating with the IC card shown in FIGS. 1 to 4. Referring to FIG. 5, an IC card reader 15 is used for communication with the IC card 10 through the input/output port 1 and the contacts 14 of an IC card inserted therein. A cathode ray tube (CRT) 16 displays procedures of a transaction and the like to a customer. A keyboard 17 is used by a customer to communicate with the terminal, if necessary. A slip issuing machine 18 receives permission of payment from a processing center and issues a slip. A paper receiving portion 19 includes unit for receiving papers, e.g. bank notes, the customer inserts on deposit and by counting the number thereof. A paper discharging portion 20 includes a unit for discharging papers, e.g. bank notes, to the customer. A bankbook printing portion 21 prints the transaction record on the entered bankbook when the bankbook is inserted into the terminal together with the IC card. Each of the units 15 ... 21 is connected to a control unit 22 through internal dots buses, so that the control unit 22 can control the operation of these units. In addition, the control unit 22 is also connected to a central processing unit of a processing center (not shown) for each bank through a line control 23 and input/output terminal 24.

Figure 7:
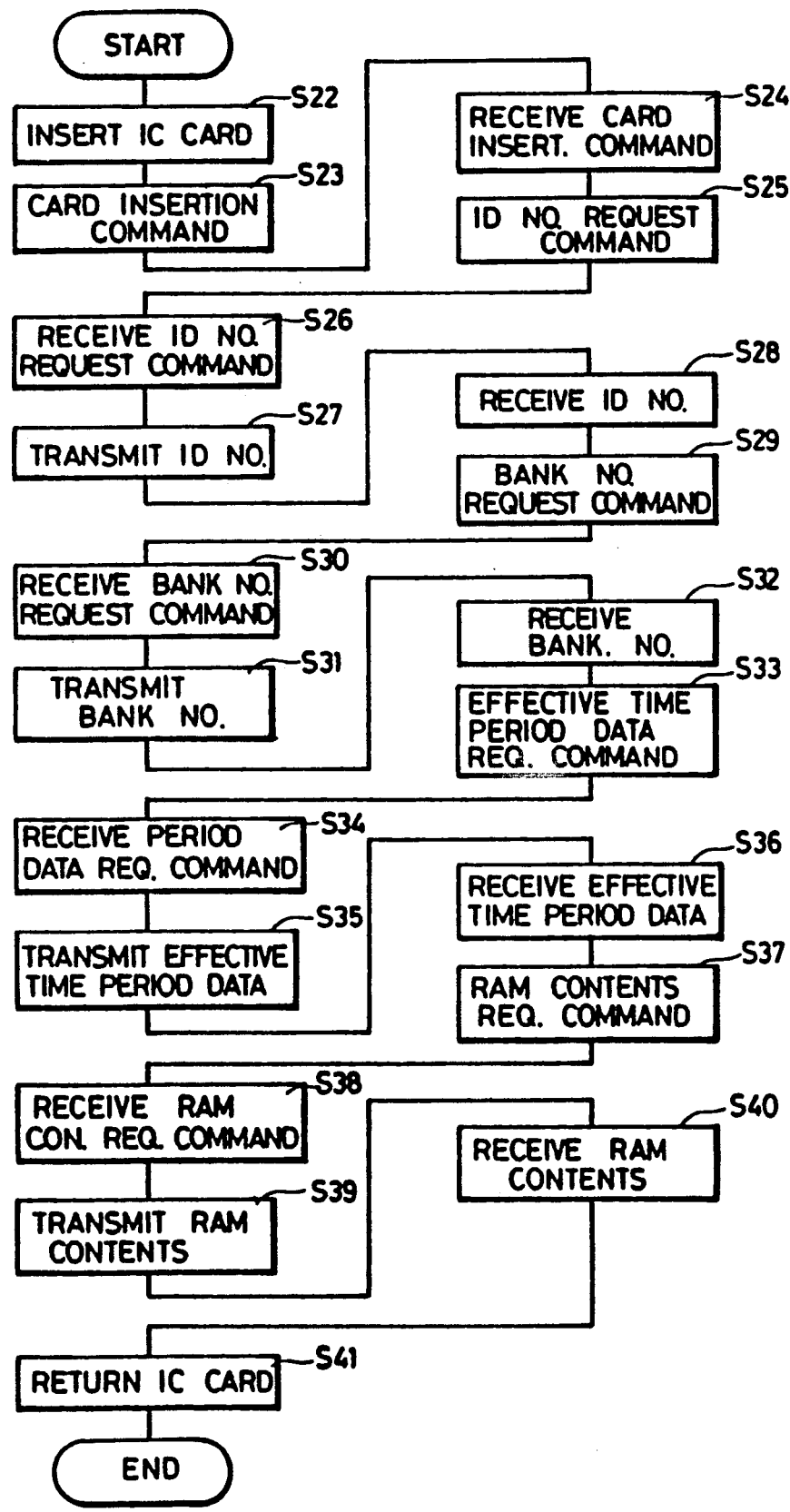
FIG. 7 is a flow diagram explaining a transaction data reading operation for the FIG. 5 processing unit.

FIG. 6 is a diagram showing a memory map of the FIG. 5 terminal for use with an IC card, while FIG. 7 is a flow diagram explaining a specific reading operation of the IC card which occurs when the IC card is inserted into the terminal.

Referring to FIGS. 5 to 7, the reading operation of the IC card will be described. Reading of the IC card is performed by means of half duplex communication system, which is the same as communication between a terminal and a center CPU.

First, an IC card having the construction described above with reference to FIGS. 1 to 4 is entered into the terminal shown in FIG. 5 and installed, for example, in a bank (step S22). Then, electric power is supplied to each of the constituent elements of the IC card shown in FIG. 1 and the CPU 2 generates a card insert command based on the program stored in the ROM 3 and transmits the command to the IC card reader 15 of the terminal through the input/output port 1 (step S23). Upon receipt of the command by the terminal (step S24), the terminal generates an ID number request command and transmits the same to the IC card (step S25). Then, in the IC card, the central processing unit 2 receiving the ID number request command from the terminal (step S26) transmits the ID number stored in the storage region of the ROM 3, shown in FIG. 3, to the IC card reader 15 of the terminal through the input/output port 1 (step S27). The terminal receives this ID number (step S28) and generates a bank number request command and transmits the same to the IC card (step S29). Then, in the IC card, the central processing unit 2 receiving the bank number request command from the terminal through the input/output port 1 (step S30) transmits the bank number stored in the storage region of the ROM 3 as shown in FIG. 3 to the IC card reader 15 of the terminal which is turn receives such bank number (step S32) and generates an effective time period data request command and transmits the same to the IC card (step S33). Then, in the IC card, the CPU 2 receiving the effective time period data requesting command from the terminal and transmits the effective time period data stored in the storage region of the ROM 3 as shown in FIG.. 3 to the IC card reader of the terminal through the input/output port 1 (steps S35 and S36).

As described in the foregoing, the fixed data relating to transaction, which is stored in the ROM 3 in the IC card, is first read out by the terminal. Then, the terminal generates a RAM storage contents requesting command for requesting the transaction data stored in advance in the RAM 4 in accordance with the respective programs and transmits the same to the IC card (step S37). Correspondingly, in the IC card, the central processing unit 2 receiving the RAM storage contents requesting command from the terminal through the input/output port 1 (step S38) transmits the RAM storage contents stored in the storage region of the RAM 4 as shown in FIG. 3, that is, the transaction data such as transaction number, a secret number, a transaction amount and a bank-to-be-transferred, to the IC card reader 1 of the terminal through the input/output port 1 (steps S39 and S40). The IC card completes its role by transmitting the RAM storage contents to the terminal and then its power supply is turned off in accordance with the program end, upon completion of transaction processing, the IC card is returned to the customer from the terminal (step S41).

Figure 8A:
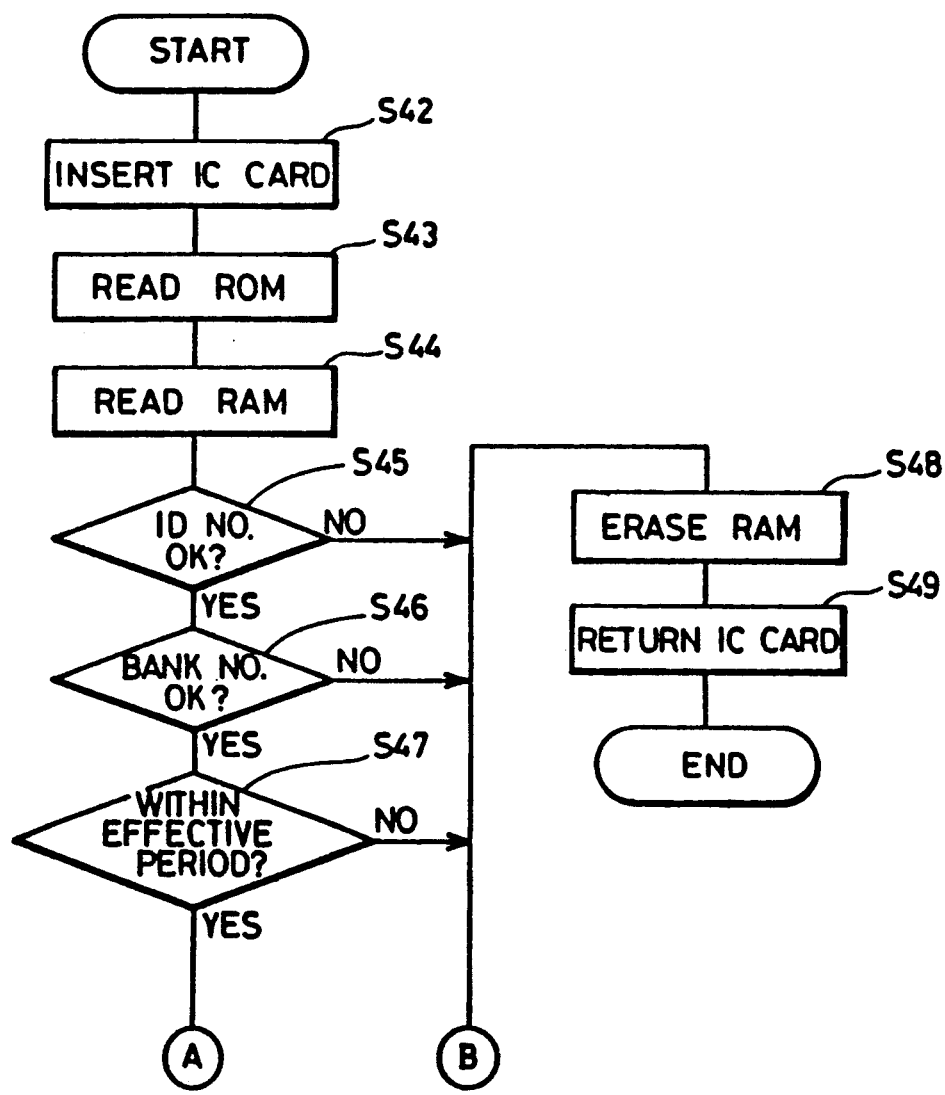
FIG. 8 is a flow diagram explaining a transaction processing at the FIG. 5 processing unit.
Figure 8B:
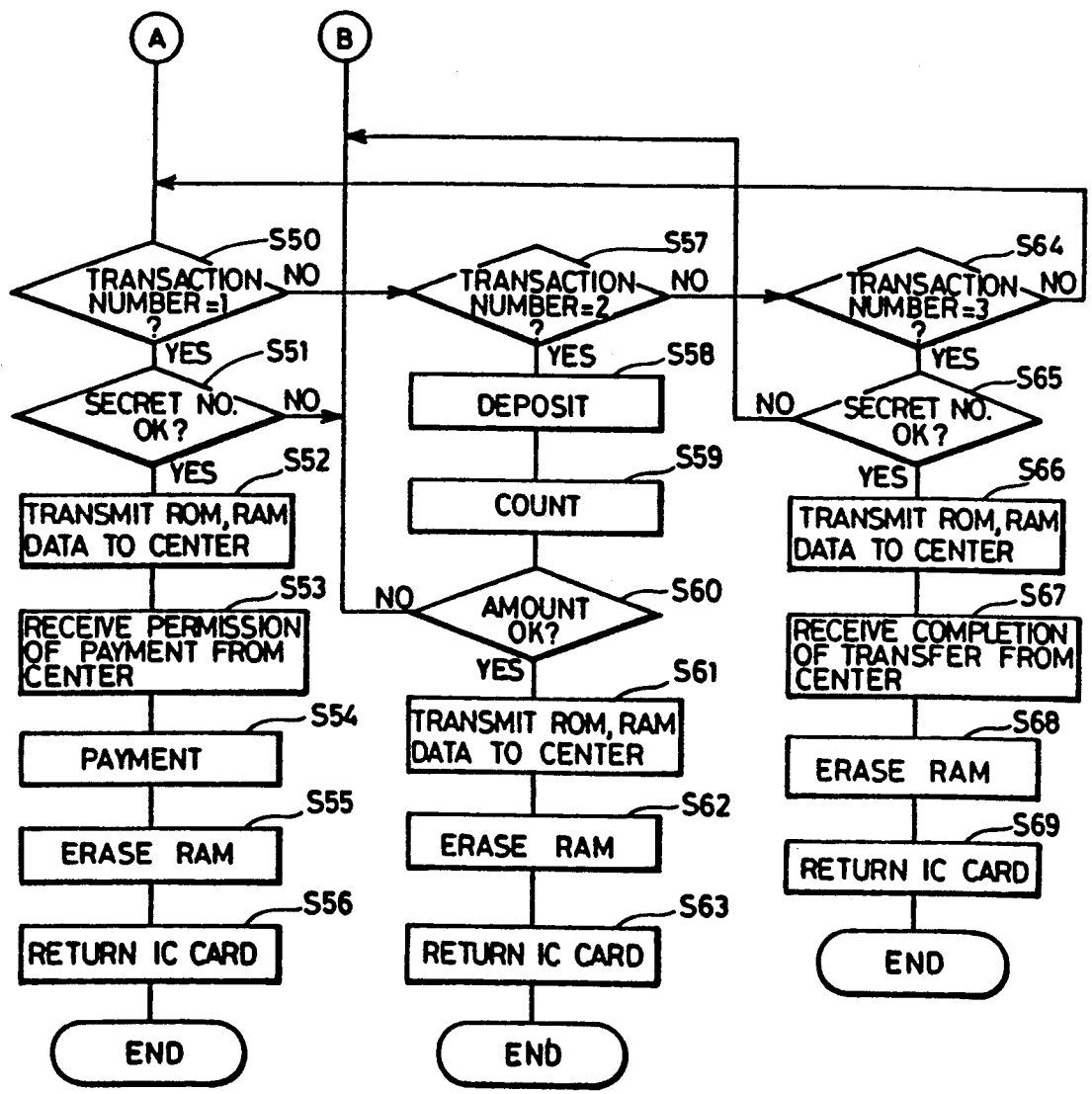

FIGS. 8(A) and 8(B) depicts a flow diagram explaining a specific transaction processing operation of the terminal from insertion of the IC card to termination of transaction processing.

Now, referring to FIGS. 1 to 8, a specific transaction processing of the terminal of one embodiment of the present invention will be described.

An IC card is first inserted into the terminal by a customer (step S42), and the data relating to a transaction is read out from the ROM 3 and RAM 4 (steps S43 and S44). The terminal first confirms the fixed data inherent to the specific bank, such as ID number, a bank number, and effective time period data read out from the ROM 3 (steps S45, S46 and S47) and if and when any inconsistency occurs, the content stored in the RAM 4 of the IC card is erased (step S48) and the IC card is returned to the customer (step S49). If and when all of the requirements are satisfied, a transaction processing is performed in accordance with a predetermined kind of requested transaction.

If and when the customer sets in advance a transaction number 1 (payment) (step S50), it is determined whether the secret number read out from the RAM 4 of the IC card is correct or not (step S51). If correct, the terminal transmits to the CPU of the center for each bank the transaction data read out from the ROM 3 and RAM 4 of the IC card (step S51). In response to the data as transmitted to the center, the center retrieves and renews the corresponding file and provides an instruction of permission for payment to the terminal. Upon receipt of this instruction (step S53), the terminal instructs a slip issuing machine 18 to issue a payment slip and instructs the paper discharging portion 20 to discharge the necessary papers, e.g. bank notes, to the client (step S54). After completion of payment to a customer, the contents stored in the RAM 4 of the IC card are erased for security (step S55) and the IC card is returned to the customer in accordance with the program (step S56) and then the transaction is completed.

If and when the customer presets in advance a transaction number 2 (deposit) (step S57), the customer inserts papers, e.g. bank notes, to be deposited to the paper receiving portion 19 (step S58). The paper receiving portion 19 counts the number of the papers (step S59) and determines whether the counted amount coincides with the amount stored in advance in the RAM 4 of the IC card (step S60). If these amounts coincide with each other, the terminal transmits to the center CPU of the bank the transaction data read out from the ROM 3 and RAM 4 of the IC card (step S61). Thus, the center retrieve and renews the corresponding file in accordance with the transmitted data. As a result, a deposit transaction processing is terminated and then the content of transaction stored in the RAM 4 of the IC card is erased (step S62) and the IC card is returned to the customer in accordance with the program (step S63).

If and when the customer presets the transaction number 3 (transfer) (step S64), it is determined whether the secret number read out from the RAM 4 of the IC card is correct or not (step S65). If correct, the terminal transmits to the center CPU of the bank the transaction data read out from the ROM 3 and RAM 4 of the IC card (step S66). The center CPU communicates with the bank to be transferred and the account number thereof, and an amount of transfer which are entered in advance. As a result, the transfer transaction is completed (step S67), and the content of the transaction stored in the RAM 4 of the IC card is erased (step S68) and the IC card is returned to the customer in accordance with the program (step S69).

As described in the foregoing, in accordance with the first described embodiment of the invention, a transaction number, a secret number and a transaction amount, which are entered through the terminal in transaction processing in a conventional system, can be securely entered in advance into an IC card, so that a customer can keep details of a transaction secret. Particularly, if the transaction number is set as a deposit or transfer, an unfair user can not use the IC card for the purpose of payment and hence good security is obtained. In addition, an operating time period when a customer can handle or operate a terminal can be set to a low value and hence efficiency of transaction processing can be improved.

Figure 9:
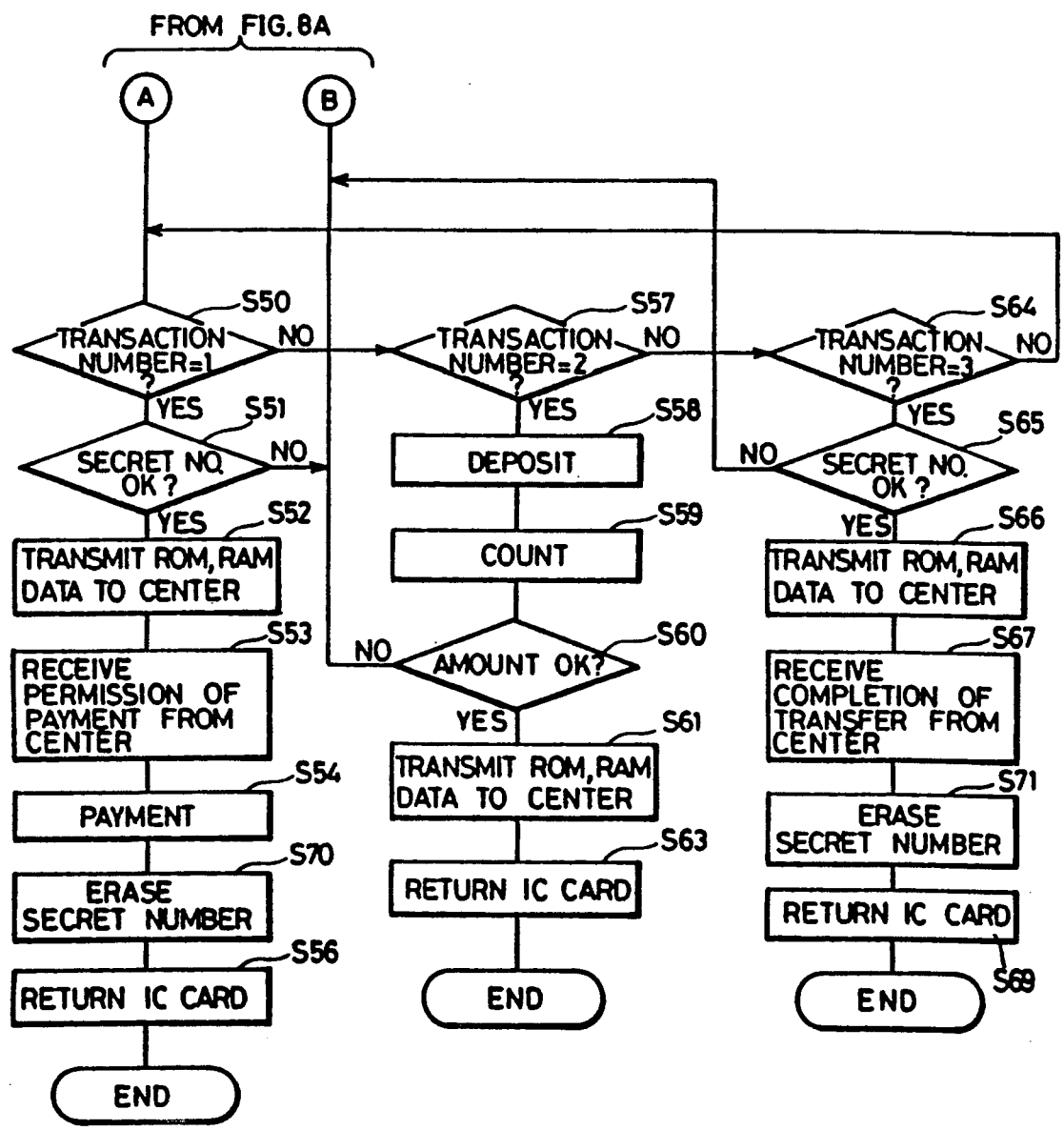
FIG. 9 is a flow diagram explaining a modified transaction processing at the FIG. 5 processing unit.

FIG. 9 is a flow diagram explaining a transaction processing of a terminal for use with an IC card, which is a modified embodiment of the present invention. The embodiment shown in FIG. 9 is the same as the financial transaction processing system as described referring to FIGS. 1 to 8, except for the following points.

Whereas in the steps S55, S62 and S68 of FIG. 8, the storage contents of the RAM 4 of the IC card are all erased, in flow diagram of FIG. 9, only a secret number is erased in the steps S70 and S71, instead of the steps S60 and S68, and erasing the storage contents of the RAM 4 in the step S62 is not performed.

If and when a customer sets in advance a transaction number 1 (payment) (step S50), only the secret number stored in the RAM 4 of the IC card is erased for safety in response to a command from a terminal when payment processing to a customer is completed (step S70) and the IC card is returned to a customer in accordance with the program (step S56) and the transaction is completed.

If and when a customer sets in advance a transaction number 2 (deposit) (step S57), the transaction contents stored in the RAM 4 of IC card are never erased after the completion of deposit transaction and the IC card is returned to a customer in accordance with a program (step S63) and a transaction is completed.

If and when a customer sets in advance a transaction number 3 (transfer) (step S64), only a secret number out of the transaction contents stored in the RAM 4 of the IC card is erased, for safety, in response to a command from the terminal (step S71), after completion of transfer transaction (step S67), and the IC card is returned to a customer in accordance with a program (step S69) and the transaction is completed.

As described in the foregoing, in accordance with the modified embodiment, after completion of transaction, a secret number stored in the IC card can be erased, so that unauthorized use can be prevented, while a transaction record relating to transaction amount and the like can be left in the IC card.

Figure 10:
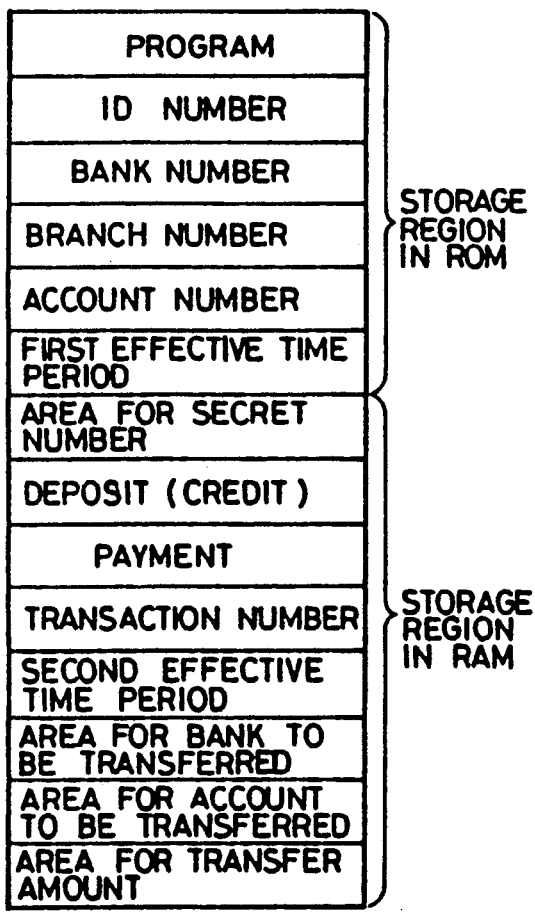
FIG. 10 is a memory map of a modified integrated circuit card.
Figure 12:
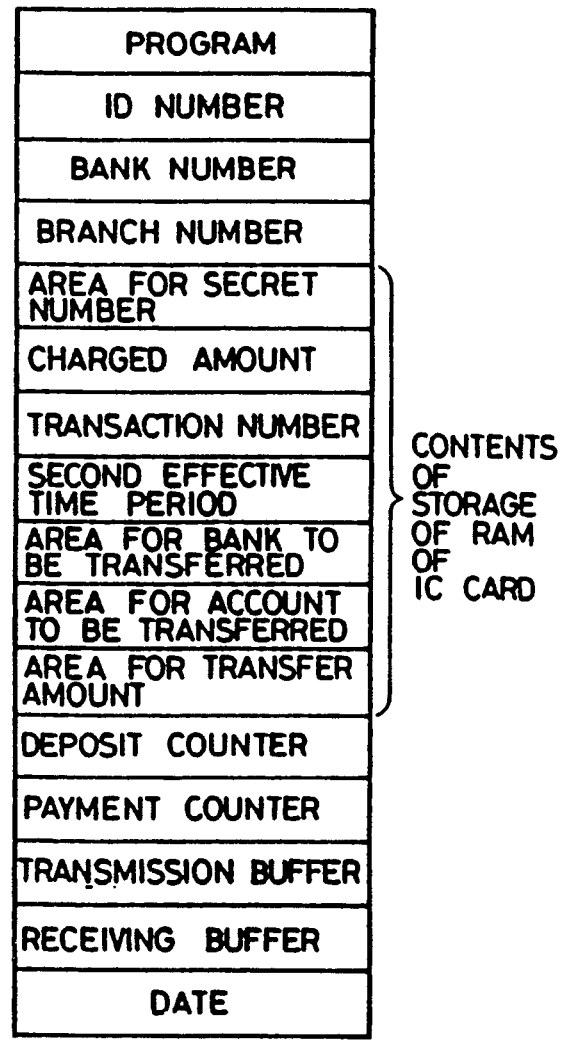
FIG. 12 is a memory map of a transaction processing unit for use with a modified integrated circuit card.
Figure 11:
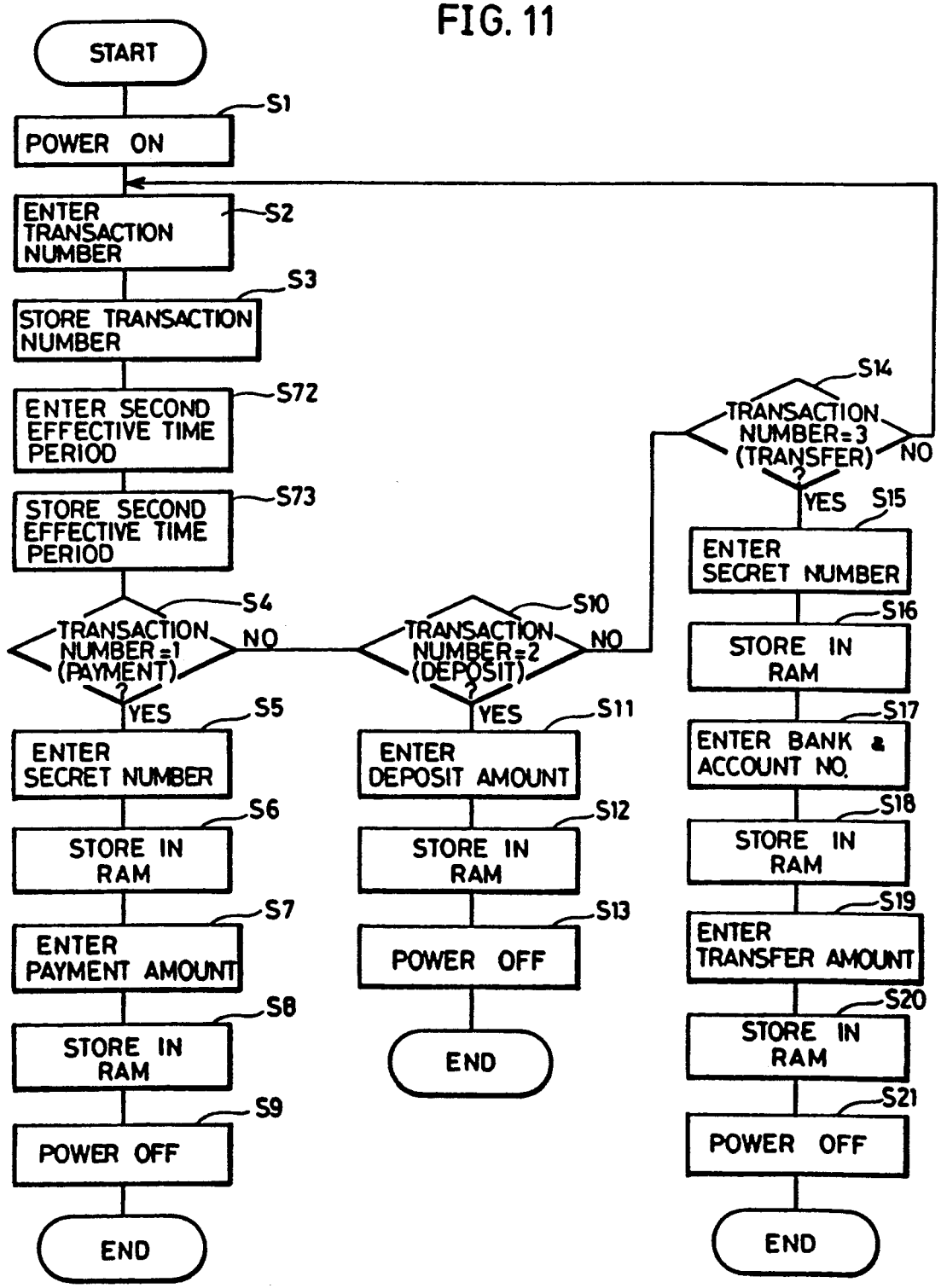
FIG. 11 is a flow diagram explaining a transaction data storing operation of a modified integrated circuit card.
Figure 13:
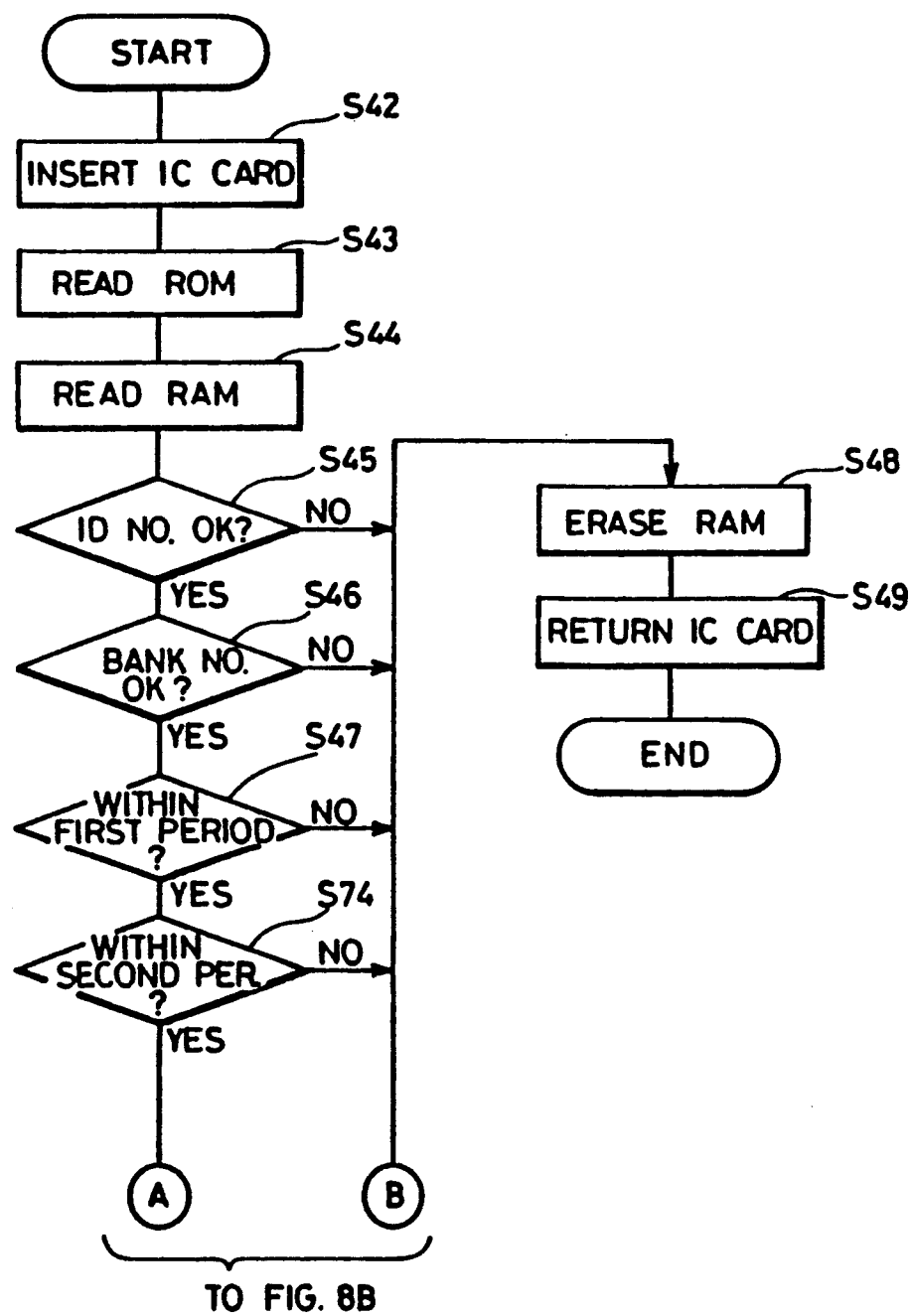
FIG. 13 is a flow diagram explaining a transaction processing of a transaction processing unit which uses the modified integrated circuit card.

FIG. 10 is a memory map of an IC card of another modified embodiment of the present invention, while FIG. 11 is a flow diagram explaining a transaction data storing operation of the IC card having the FIG 10 memory map, FIG. 12 is a memory map of a terminal for communicating with the IC card, and FIG. 13 is a flow diagram explaining a transaction processing of the terminal using an IC card having the FIG. 10 memory map.

The modified embodiment shown in FIGS. 10 to 13 is the same as the financial transaction processing system shown in FIGS. 1 to 8, except for the following points.

As shown in the step S72 of FIG. 11, a customer also sets a second effective time period and enters the data thereof into the IC card. Meanwhile, the effective time described with reference to FIGS. 1–8 as a fixed data is now referred to as a first effective time period. The second effective time period is determined based on the time interval from the time of the data entrance to the arrival at a bank. That is, first the expected time when a transaction will be completed is set as the first effective time period and then the second effective time period is set so that it lapses at a time after completion of the transaction should have taken place. As shown in FIG. 10, the second effective time period is stored in the storage region of the RAM 4 of the IC card (step S73).

In case where a transaction processing is performed using an IC card in which the above described second effective time period is stored, it is first determined in the terminal whether the time when the transaction in question is being performed is within the first time period (step S47) and if so the terminal next determines if the transaction is being performed in the second effective time period stored in the RAM 4 of the IC card (step S74 of FIG. 13). If and when the second effective time period has already lapsed, the contents stored in the RAM 4 of the IC card are erased (step S48) and the IC card is returned to a customer (step S49). If and when the second effective time period has not already lapsed, a transaction processing is performed in accordance with the kind of transaction as set in advance.

As described in the foregoing, in accordance with the present embodiment, security for transaction can be increased by setting the desired effective time period, because even if the IC card happens to be in the possession of an unauthorized user through theft, loss and the like, the unfair use can not be realized if the effective time period lapses.

Although in the above described embodiments, a transaction number, a secret number, and a transaction amount have been stored in advance in the IC card, it is also possible to have the IC store only a transaction number prior to transaction processing and then to enter the secret number and transaction amount by using the data entry device of the automatic transaction processing terminal at the time of transaction processing. It is also possible to have the IC card store a secret number and a transaction amount prior to the transaction processing and then a transaction number entered at an automatic transaction processing terminal at the time of the transaction. These variations will be described in greater detail below with respect to the system illustrated in FIGS. 14 through 20.

Figure 14A:
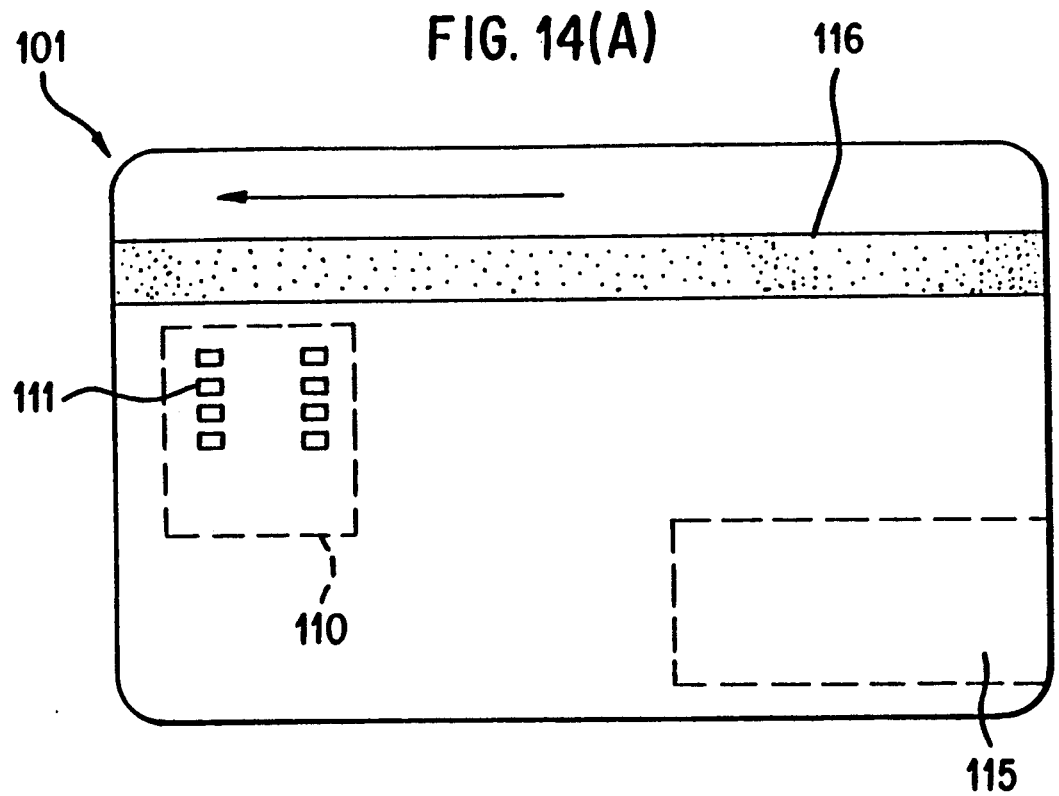
FIG. 14(A) and 14(B) show the external appearance of an IC card used in an IC card transaction system in accordance with another embodiment of the present invention, FIG. 14(A) showing the obverse surface of the card, and FIG. 14(B) showing the reverse surface of the card.
Figure 14B:
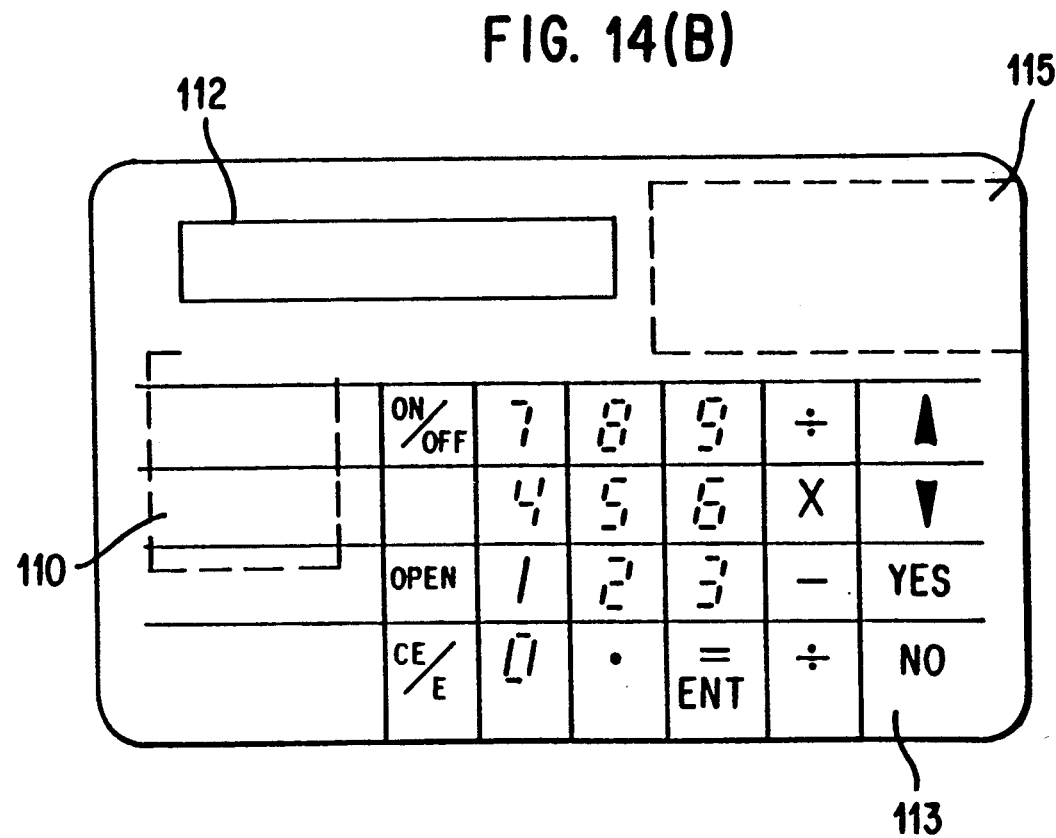

FIGS. 14(A) and 14(B) respectively show the external appearance of the obverse and reverse surfaces of another IC card 101 which is used in an IC card transaction system in accordance with yet another embodiment of the present invention. The obverse surface of the IC card is provided with a magnetic strip 116 which is used when a transaction is processed with a conventional magnetic card reader/writer. An LSI (large scale integrated) circuit 110 which includes a microcomputer is incorporated inside the card and in the vicinity of the magnetic strip. Contacts 111, which are used to exchange data with the IC card reader/writer of the automatic transaction processing unit, are provided on the obverse surface of the card at the position where the LSI is incorporated, and a flat plate-shaped battery 115 is incorporated inside the card and at the lower side thereof.

The reverse surface of IC card 101 is provided with an LCD dot matrix display 112 and a keyboard 113. The display 112 consists of display sections for 110 characters, each character display section consisting of 5×7 LCD dots. The display 112 displays brief guidance information corresponding to each operation step executed by the user, such as inputting data, etc. The IC card 101, when not used as a card for a financial transaction, can also be used as a card-type calculator in which case the display 112 displays registered numbers and results of a calculation.

The keyboard 113 comprises at least an ON/OFF key, a CE/C key, ten numerical keys, an =/ENT key, four arithmetic operation keys, a YES key, a NO key, etc. These keys are employed to enter transaction processing data and also to execute calculations when the IC card is employed as a calculator.

FIG. 15 is a block diagram of the internal control section of the IC card 101. The LSI circuit 110 comprises a CPU 200, a mask programmed ROM 201, a controller 202 for the contacts 111, and an LCD driver 203 for controlling the display 112. The contacts 111 are connected to the controller 202, and the display 112 is connected to the LCD driver 203. The keyboard 113 and an external RAM 114 are connected to the CPU 200. The RAM 114 is backed up by the battery 115.

Figure 16:
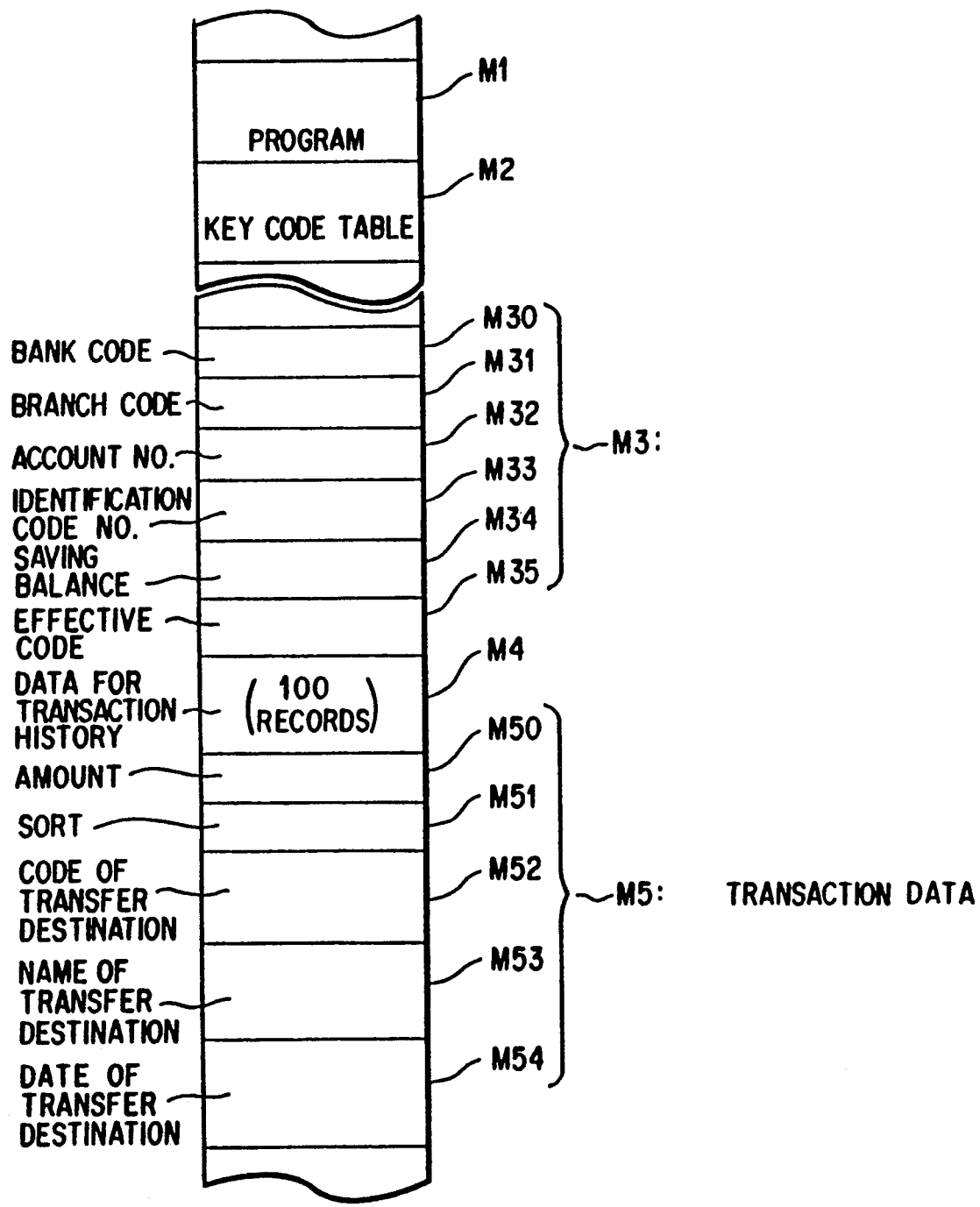
FIG. 16 shows a part of the arrangement of a mask programmed card.

FIG. 16 shows a part of the data storage arrangement of the mask programmed ROM 201 and the RAM 114. In the mask programmed ROM 201 are set a control program (M1) and a key code table (M2) that stores the contents of a selected processing function corresponding to a numerical value input through the keyboard 113. In the RAM 114 is stored card data (M3) consisting of a bank code (M30), a branch code (M31), an account number (M32), an identification code number (M33), a savings balance (M34) and an effective code (M35). Further, 100 records (M4) in the history of transactions conducted with the IC card are stored in the RAM 114. When the user selects a transaction history display function by actuating the keyboard 113, the transaction history data can be displayed on the display 112. The RAM 114 is further provided with a transaction processing data storage area (M5) for storing necessary transaction processing data used on a transaction which is to be conducted next. The transaction processing data storage area (M5) consists of an area (M50) for storing the amount of money involved in a transaction, an area (M51) for storing the kind of a particular transaction, an area (M52) for storing the code of a transfer destination, and an area (M53) for storing the name of a transfer destination, and an area (M54) for storing the date of transfer. Data which is required for a particular transaction (receipt, payment, transfer, etc.) is stored exclusively in memory area (M5).

Figure 17:
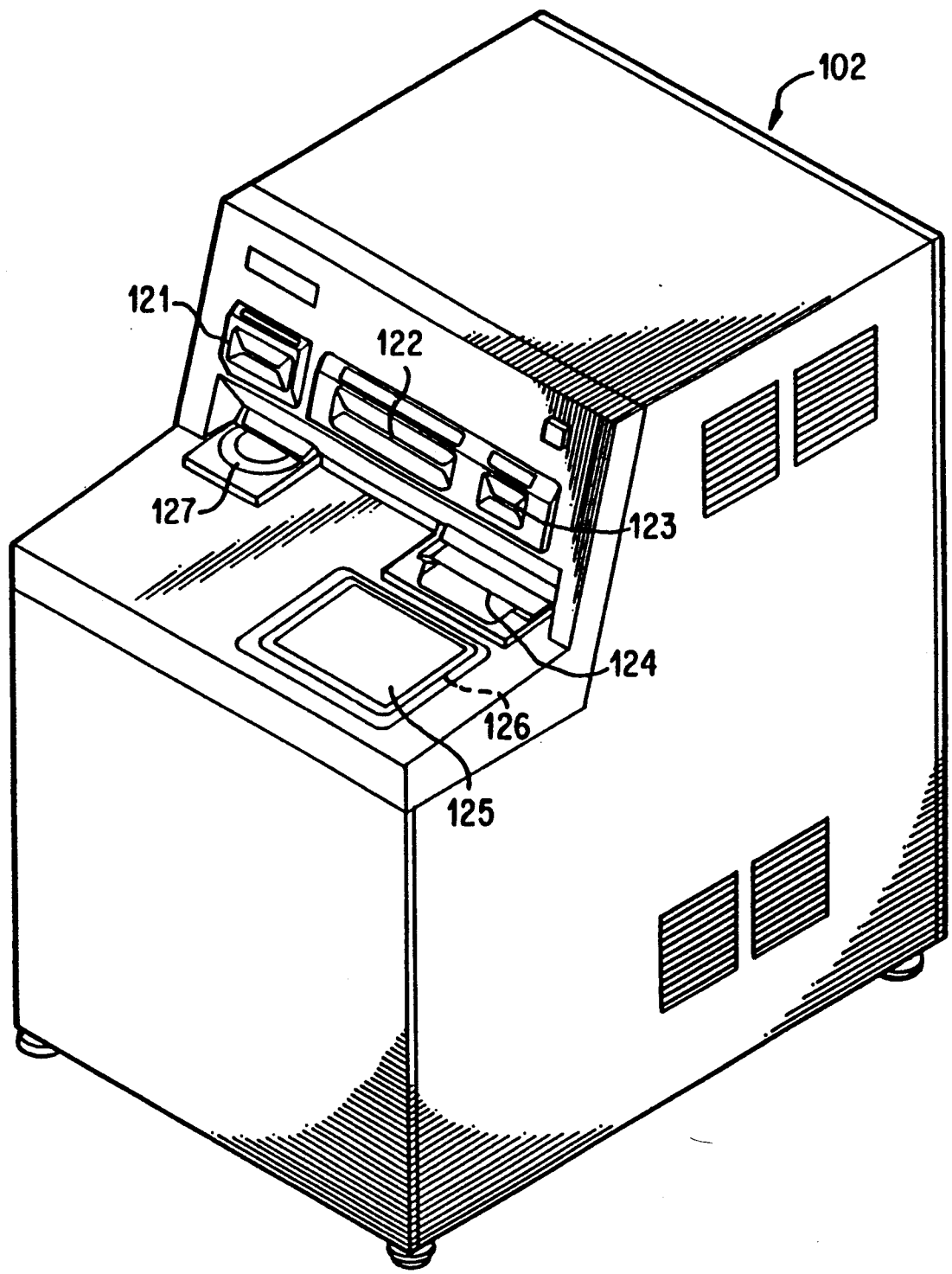
FIG. 17 show the external appearance of an ATM used with the FIG. 14 IC card.

FIG. 17 shows the external appearance of an automatic transaction processing unit in the form of an ATM 102 which is used with the IC card depicted in FIGS. 14–16. The ATM 102 has a vertical control panel on its front side, the control panel being provided with an IC card insertion opening 212 for inserting the IC card 101, a bankbook insertion opening 122 and a magnetic card insertion opening 123. The horizontal control panel of the ATM is provided with a bank not receiving and paying opening 124, a CRT 125, and a coin receiving and paying opening 127. The CRT 125 is used to guide and display the functioning of the ATM, e.g. the operating procedure and the like, and also displays input keys which are to be depressed by a customer. A transparent touch panel switch 126 is installed on the surface of the CRT 125 for detecting the depression of various keys which are displayed on the CRT 125.

FIG. 18 is a block diagram of the control section of the FIG. 17 ATM. To a CPU 128 of the ATM 102 are connected a ROM 129 storing programs and the like, a RAM 130 storing data and the like, and an interface 131. To the interface 131 are connected a display deice 132 including the CRT 125, a touch panel unit 133 including the touch panel switch 126, an IC card reader/writer 134 which exchanges data and the like with an IC card inserted into the IC card insertion opening, 121, a magnetic card reader 135 which reads and writes data in relation to a magnetic card inserted into the magnetic card insertion opening 123, a bank note processing section 136 which processes the receipt and payment of bank notes, a coin processing section 137 which processes the receipt and payment of coins, a bank processing section 138 which prints results of transactions on bankbooks or slips, and a communication control section 139 for communication with a center processing unit.

Figure 19B:
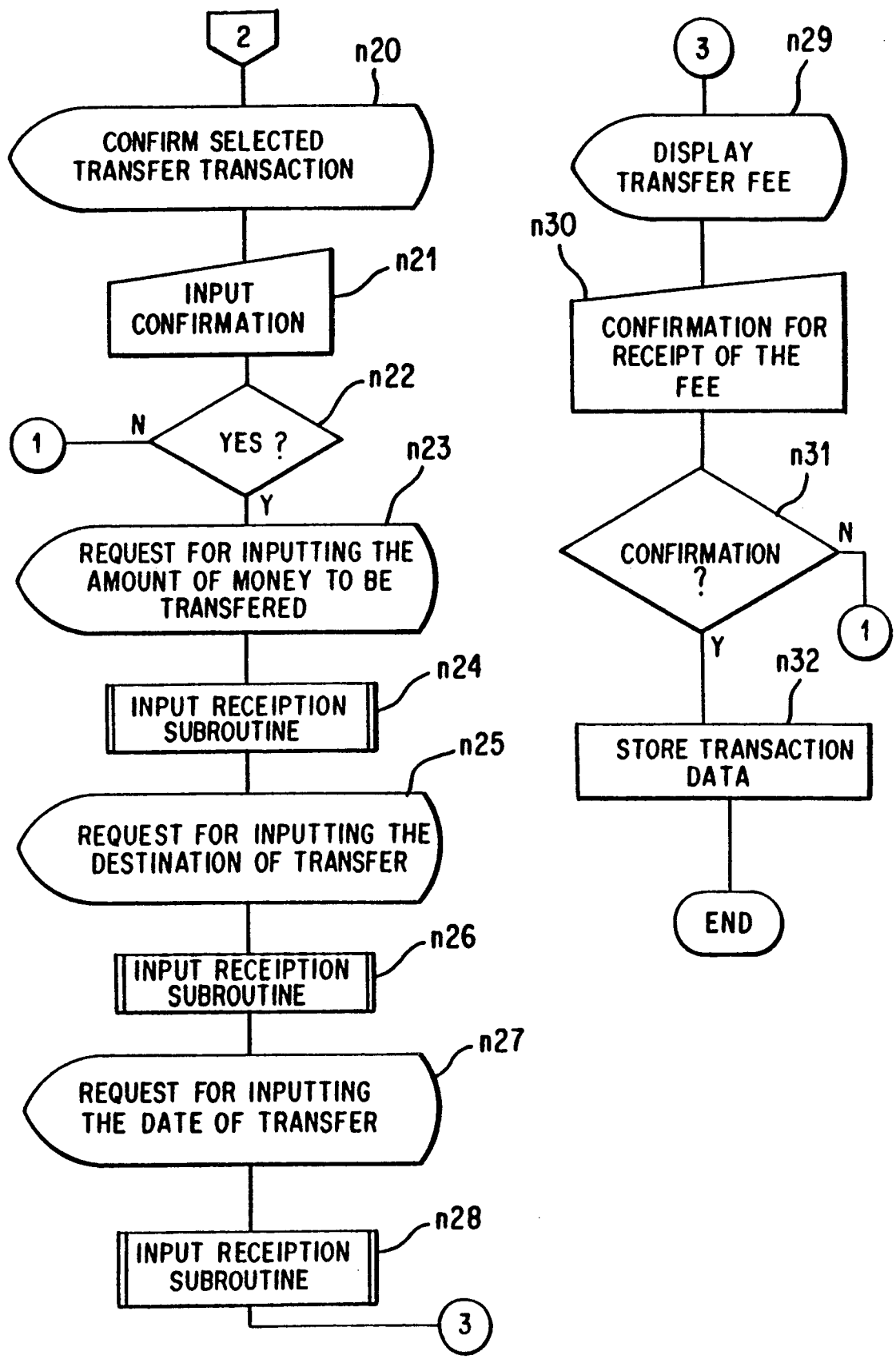

FIGS. 19(A), 19(B) and 19(C) depict a flow chart showing the operation of the control section in the IC card 101.

FIG. 19(A) shows a processing content selecting operation. When the ON/OFF key of the keyboard 113 is depressed, power is supplied to the LSI 110, and the IC card 101 first operates as a calculator and is started (for FIGS. 19 and 20 the processing steps are shown as step n1: "Step ni" will hereinafter be referred to as "ni"). Next, when the OPEN key is depressed (2), the display 112 is instructed to request the user to enter his identification code number in order to permit acceptance of transaction processing data (n3). The identification code number is entered (n4), and a determination is made (n5) as to whether or not the entered code number is coincident with the identification code number (M33) which has been stored in the card data storage (M3). If NO, the process proceeds to a step (n6), where a determination is made as to whether or not this identification code number entry error is the third by making reference to the effective code storage area (M35). The effective code is a number which represents the number of times of successive occurrences of an identification code number entry error. If the identification code number entry has occurred three or more times, the card function is locked and processing is finished (n7). If the identification code number entry error has not yet occurred three times, "ERROR" is displayed on the display 112 (n8), and after a confirmation entry (depression of the YES key) has been made by the user (n9), the process returns to n3. When it is confirmed in n5 that the entered identification code number is coincident with the stored one, the process proceeds to n10, where the mode is changed to the transaction code mode, and the display 112 is instructed to request the user to enter data for selecting a desired transaction (n11). After the input of the transaction code has been made (n12), the input transaction code is checked in n13. If there is no corresponding transaction code, the process returns to n11 in order to request the user to enter the code again, whereas, when there is a corresponding transaction code, the process proceeds to a step of performing a transaction processing data receiving operation.

FIG. 19(B) shows a transaction processing data receiving operation which is carried out when a transfer transaction is selected. First, the display 112 is instructed to request the user to confirm the selected transfer transaction in n20, and a confirmation entry is received from the user in n21. When the YES key is depressed by the user, the process proceeds to n23 and further to the steps following it, whereas, when the NO key is depressed, the process returns to n11 (n22).

The display 112 is instructed to request the user to enter the amount of money desired to be transferred in n23, and an entry reception subroutine for controlling the entry of the amount of money to be transferred is executed in n24. This subroutine will be described later with reference to FIG. 19(C). Next, the display 112 is instructed to request the user to enter the destination of the transfer and the date of the transfer and the entry reception subroutine is executed in a similar manner (n25 to n28), and finally, a transfer fee is displayed (n29). After the confirmation with respect to the displayed transfer fee has been entered (n30 and n31), the entered data are stored in the transaction processing data storage area (M6) and the operation is thus completed. If the NO key is depressed in n30, the process proceeds to n31, and when NO is the answer of the decision made in n31, the process returns to n11, where the entry of data is made again.

FIG. 19(C) shows the entry reception subroutine. The process stands by until depression of one of the numeral keys is detected in n41. If the numeral keys are depressed, the input numerical value is buffered in a register buffer (n42), and the process then returns to the stand-by routine.

On the other hand, when the ENT key is depressed, a decision is made (n43) as to whether or not a registered numerical value has been stored in the register buffer. When the registered numerical value has been stored, this numerical value is stored as transaction processing data in a transaction processing data buffer which temporarily stores transaction processing data, and the register buffer is cleared (n44). When no numerical value has been input to the register buffer, this means that the transaction processing data is not being entered but is being skipped. More specifically, the called-for input transaction processing data which is not entered is determined to be data which is to be directly entered later at the automatic transaction processing unit, and a skip code (e.g., "x") is stored in the transaction processing data buffer (n45). Next, the decided input data is displayed in n46, and a confirmation entry by the user is received (n47). If the user depresses the YES key, indicating confirmation, the process returns to the main routine, whereas, if the NO key is depressed, indicating no confirmation, the buffered data is cleared in n44, and the process returns to the stand-by routine including steps n40 and n41. It should be noted that the transaction processing data buffer has an arrangement similar to the transaction processing data storage area (M5), and the stored contents are moved in n32.

Figure 20A:
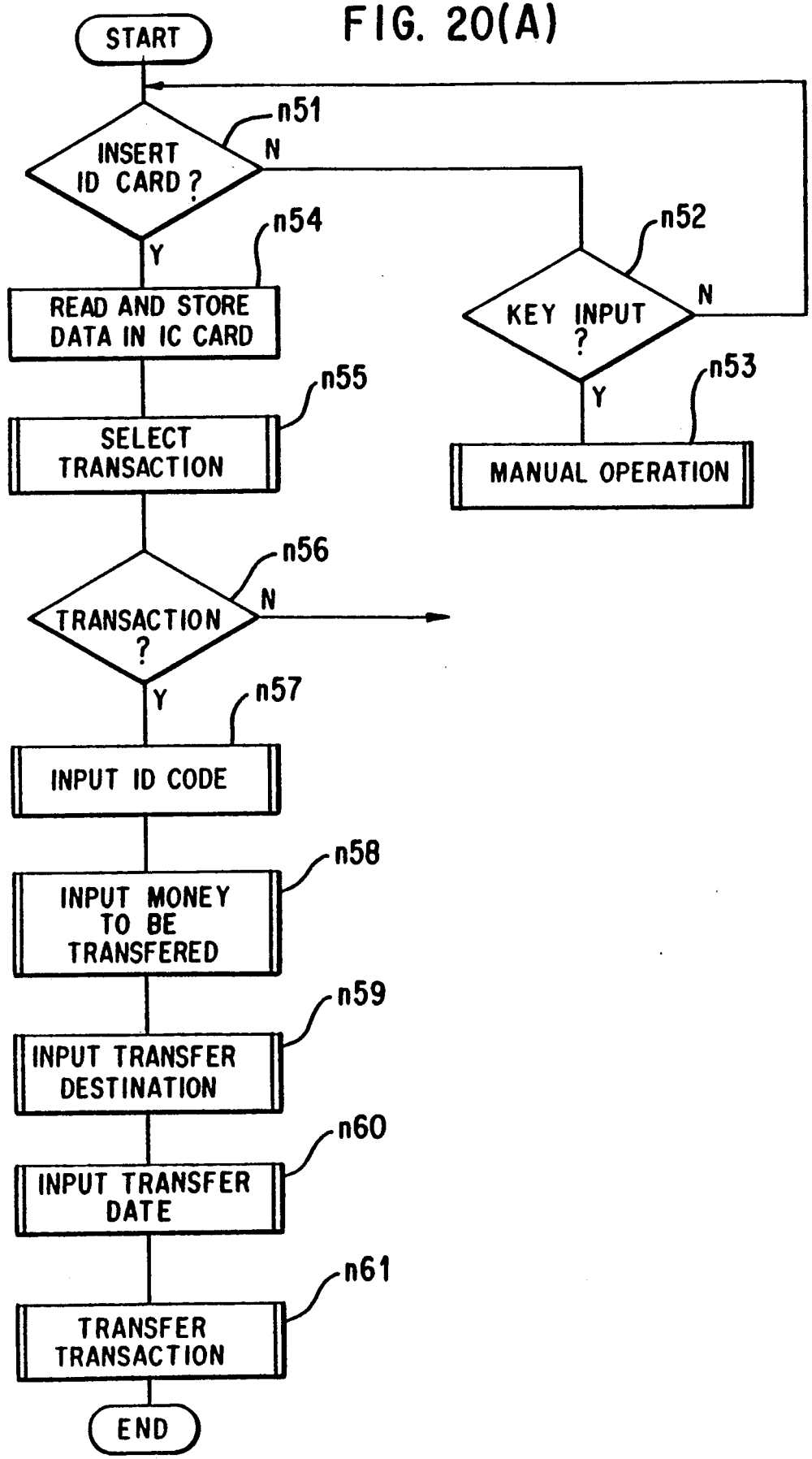
FIGS. 20(A) and 20(B) are flow charts showing the operation of the control section in the FIG. 17 ATM.

FIG. 20(A) is a flow chart showing the operation of the control section in the ATM 102. The process stands by until the IC card 101 is inserted in n51 or any of the keys are depressed in n52. When it is determined in n51 that the IC card 101 is inserted, the process proceeds to n54 and the steps following it to execute various transaction processing operations. More specifically, the card data and transaction selecting subroutine (n55) are executed on the basis of the buffered transaction processing data and the like, and the process then branches off to a selected transaction processing operation in n56. A transfer transaction processing operation will be explained below. In the transfer transaction processing operation, an identification code input subroutine (n57), a transferred money setting subroutine (n58), a transfer destination setting subroutine (n59) and a transfer data input subroutine (n60) are executed. The transfer transaction processing is executed on the basis of the transaction processing data set in these subroutines.

Figure 20B:
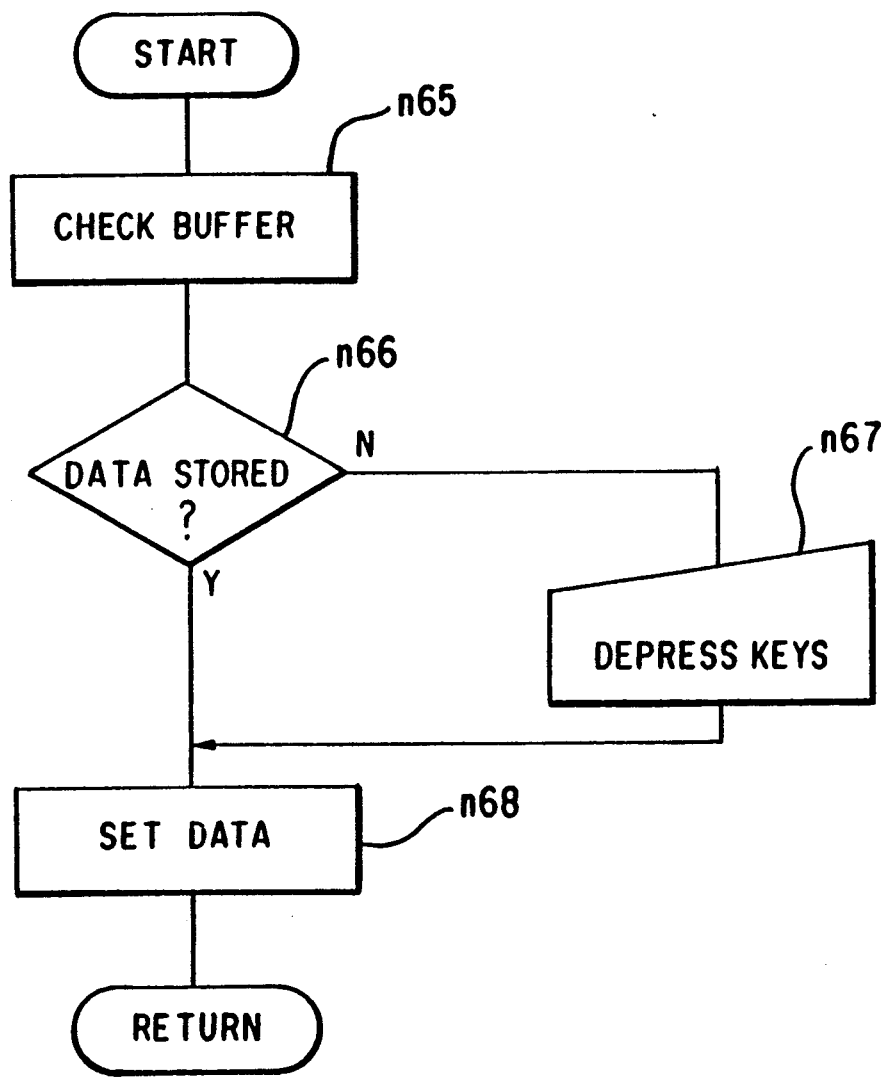

FIG. 20(B) is a flow chart showing the steps executed in each of the above-mentioned subroutines (n57 . . . n60). First, a determination is made (n66) as to whether or not the corresponding transaction processing data has been previously stored in the IC card and from there into the automatic transaction processing unit in step n54, by making reference to the buffer into which the transaction processing data on the card has been read in n65. For example, for subroutine n57, a determination is made on whether the ID code is stored in the buffer. When the predetermined data has been stored in the buffer, this data is set as transaction processing data used in the relevant subroutine (n68), and the process then returns to the main routine. On the other hand, when the corresponding transaction processing data has not been stored in the buffer indicating that it is to be entered at the terminal unit, the required data is then entered by depressing the keys displayed on the CRT 125, and is received in n67, and the entered data is set as the corresponding transaction processing data (n68) and the process then returns to the main routine.

The keyboard 113 and steps n23 to n28, together with the subroutine shown in FIG. 19(C), correspond to the transaction processing data receiving means according to the present invention, and the RAM 114 and step n32 correspond in combination to the transaction processing data storage means. Further, steps n54 and n65 correspond in combination to the transaction processing data read means and step n67 corresponds to the input data receiving means according to the present invention for receiving transaction data not previously stored in the transaction processing data storage means.

As evident from the foregoing, the IC card transaction system in accordance with the described embodiments of the invention enables a desired part of, or all of, the data required for an individual transaction processing to be pre-stored in an IC card in advance. With the invention, it is possible to insert the IC card into an automatic transaction processing unit and if all financial transaction data has been previously entered into the card to immediately carry out the financial transaction in accordance with the data read out from the IC card. It is also possible to omit certain data entry operations which are necessary for a financial transaction when entering data into the card so that when the card is inserted into the automatic transaction processing terminal, the missing data is elicited from the customers by the terminal and entered through a corresponding data entry device at the terminal unit. With the invention, it is possible to reduce the time required for completing a transaction at the terminal since at least a portion, if not all, of the financial transaction data has been previously entered into the card prior to a customer arriving at the terminal. Thus, it is possible to improve the operating efficiency of the automatic transaction processing unit and minimize entry problems.

Still further, since it is possible that only a desired part of the needed transaction processing data is stored in the IC card in advance, if an IC card having only a portion of the data therein is lost, a finder of the card cannot improperly use it since entry of additional necessary transaction processing data is still required.

Moreover, since the IC card may be provided with an LCD display and include 100 records stored in the memory as transaction history data on the display 112 by actuating predetermined keys of the IC card.

While preferred embodiments of the invention have been shown and described, it is apparent that many modifications can be made thereto without departing from the spirit and scope of the invention. Accordingly, the invention is not limited by the foregoing description, but is only limited by the scope of the appended claims.

We claim:

1. A financial transaction processing system comprising:

(a) an integrated circuit card for use in transaction processing, comprising:

first storing means for storing at least a portion of the data necessary for executing a financial transaction;

second storing means for containing a program of data processing procedures;

data entering means for entering at least a portion of the data necessary for execution of said financial transaction into said first storing means;

third storing means for storing data concerning a preset first effective time period for executing said financial transaction, said first effective time period data being entered into said third storing means by said data entering means in advance of using said integrated circuit card for transaction processing;

fourth storing means for storing data relating to a variable second effective time period for executing said financial transaction, said variable second effective time period being entered into said fourth storing means by said data entry means;

data display means for displaying said entered data; and data processing means connected to said first storing means for processing said entered data in accordance with said program stored in said second storing means prior to financial transaction processing; and (b) terminal means for communicating with said integrated circuit card, comprising:

data reading means for reading out the data stored in said first storing means;

means for reading said first effective time period stored in said third storing means and said second effective time period stored in said fourth storing means;

effective time period detecting means for detecting if the time when said financial transaction is performed is within said preset first effective time period and said variable second effective time period;

said data reading means being responsive to the output of said effective time period detecting means for reading the data stored in said first storing means; and transaction processing means for executing said financial transaction using said read data to complete a financial transaction processing.

2. A financial transaction processing system as in claim 1, wherein said terminal means further comprises means for entering additional data necessary for execution of the financial transaction processing which was not stored in said first storing means, said transaction processing means executing said financial transaction using said read data and additional data entered at said means for entering additional data.

3. A financial transaction processing system as in claim 1, wherein
the transaction data stored in said first storing means includes at least one of an account number, a secret number, a designation of a type of transaction, and a transaction amount.

4. A financial transaction processing system in accordance with claim 1, wherein
the transaction data stored in said first storing means includes
a transaction number designating a kind of transaction.

5. A financial transaction processing system in accordance with claim 1, wherein said terminal means further comprises
transaction termination detecting means for detecting termination of the processing of said financial transaction, and
data erasing means responsive to the output of said transaction termination detecting means for erasing at least a portion of the data stored in said first storing means.

6. A financial transaction processing system in accordance with claim 5, wherein the transaction data stored in said first storing means includes a secret number which is erased by said data erasing means.

7. A financial transaction processing system in accordance with claim 1, wherein said integrated circuit card further comprises additional storing means for storing a transaction record of a predetermined number of transactions executed with said IC card.

* * * * *